United States Patent
Tanner et al.

(10) Patent No.: US 11,417,054 B1
(45) Date of Patent: Aug. 16, 2022

(54) MIXED REALITY OBJECTS IN VIRTUAL REALITY ENVIRONMENTS

(71) Applicant: Facebook Technologies, LLC, Menlo Park, CA (US)

(72) Inventors: Christopher Richard Tanner, San Carlos, CA (US); Amir Mesguich Havilio, San Francisco, CA (US); Michelle Pujals, Los Gatos, CA (US); Gioacchino Noris, Zurich (CH); Alessia Marra, Zurich (CH); Nicholas Wallen, South San Francisco, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/204,699

(22) Filed: Mar. 17, 2021

(51) Int. Cl.
    G06T 15/20      (2011.01)
    G06F 3/01       (2006.01)
    G06F 3/04842    (2022.01)
    G06V 20/20      (2022.01)

(52) U.S. Cl.
    CPC ............ *G06T 15/205* (2013.01); *G06F 3/011* (2013.01); *G06F 3/04842* (2013.01); *G06V 20/20* (2022.01); *G06T 2200/24* (2013.01); *G06T 2215/16* (2013.01)

(58) Field of Classification Search
    CPC combination set(s) only.
    See application file for complete search history.

(56) References Cited

U.S. PATENT DOCUMENTS

| | | | |
|---|---|---|---|
| 9,129,404 B1* | 9/2015 | Wagner | G06Q 30/0643 |
| 11,009,716 B2* | 5/2021 | Kiemele | G02B 27/017 |
| 11,270,522 B1* | 3/2022 | Tauber | G06T 7/11 |
| 2016/0147408 A1 | 5/2016 | Bevis et al. | |
| 2016/0189386 A1* | 6/2016 | Michaelraj | G06T 7/13 382/154 |
| 2018/0365897 A1* | 12/2018 | Pahud | G06F 3/1454 |
| 2019/0018498 A1* | 1/2019 | West | G06F 3/04845 |
| 2019/0340799 A1 | 11/2019 | Dryer et al. | |
| 2019/0371279 A1* | 12/2019 | Mak | G06F 3/147 |
| 2020/0151965 A1* | 5/2020 | Forbes | G06T 19/006 |
| 2020/0279386 A1* | 9/2020 | da Veiga | G06T 7/55 |
| 2020/0312028 A1* | 10/2020 | Charvat | G05D 1/0094 |

* cited by examiner

*Primary Examiner* — Motilewa Good-Johnson
(74) *Attorney, Agent, or Firm* — Baker Botts L.L.P.

(57) ABSTRACT

In one embodiment, a method includes displaying, for one or more displays of a virtual VR device, a first output image comprising a passthrough view of a real-world environment. The method includes identifying, using one or more images captured by one or more cameras of the VR display device, a real-world object in the real-world environment. The method includes receiving a user input indicating a first dimension corresponding to the real-world object. The method includes automatically determining, based on the first dimension, a second and third dimension corresponding to the real-world object. The method includes rendering, for the one or more displays of the VR display device, a second output image of a VR environment. The VR environment includes a MR object that corresponds to the real-world object. The MR object is defined by the determined first, second, and third dimensions.

20 Claims, 19 Drawing Sheets

MIXED REALITY OBJECTS IN VIRTUAL REALITY ENVIRONMENTS

TECHNICAL FIELD

This disclosure generally relates to databases and file management within network environments, and in particular relates to interacting with mixed reality (MR) objects in a virtual reality (VR) environment.

BACKGROUND

Traditional methods of spatial awareness to keep users in VR environments safe require the user to define a boundary wall that represents the outer bounds of a safe boundary perimeter for the user to move around in. For example, the user can draw a line on the floor in a room as the boundary. The boundary can be drawn to prevent the user from running into real-world objects such as chairs and desks as they move around in the VR environment. As the user approaches the boundary, a virtual wall may appear to alert the user they are approaching the boundary, which may indicate that there is a real-world object such as a chair or a desk in the user's path.

SUMMARY OF PARTICULAR EMBODIMENTS

In particular embodiments, a user of an immersive virtual reality (VR) system (e.g., head-mounted VR goggles) may have their view of the real-world environment partially or fully occluded by the VR system, and thus risk running into or hitting real-world objects while immersed in a VR environment. Additionally, immersion in the VR environment may disorient the user as to their position and/or orientation in the real-world environment. That is, the user may forget the direction where furniture or other objects in their vicinity are. Thus, one technical challenge may include interacting with real-world objects while the user is in an immersive VR experience. Traditional methods of keeping the user safe and helping the user orient themselves in a VR environment include drawing a virtual boundary, which defines a safe zone for the user while they are in the VR experience. As the user approaches the virtual boundary, a virtual boundary wall may appear or activate. These virtual boundary walls may have grid-like appearances. These virtual boundary walls may break the immersion of the VR environment, may inhibit the use of a real-world space while immersed in the VR experience, and may detract from the user's VR experience. One solution presented by the embodiments disclosed herein to address the technical challenge of interacting with real-world objects while the user is in an immersive VR experience may be to provide a passthrough view of the real-world environment within the VR environment to identify real-world objects that can be incorporated into the VR environment, and render in the VR environment a mixed reality (MR) object that corresponds to the real-world object. A technical advantage of the embodiments may include incorporating real-world objects as MR objects that the user can interact with while in the VR environment. As an example and not by way of limitation, a user may identify a real-world desk in the real-world environment, determine the dimensions of the desk, and render a MR desk corresponding to the real-world desk for the user to interact with while immersed in the VR environment, where the MR desk may correspond to the real-world environment and be defined by the dimensions of the real-world desk. This may allow the user to incorporate real-world objects into their VR environment, thus expanding the space the user can safely explore while immersed in the VR environment. Additionally, the user may be able to use the MR objects to help determine their pose (e.g., position and orientation) in the real-world environment while immersed in the VR environment, for example, by incorporating familiar real-world furniture, walls, electronic devices (e.g., turning a real-world tablet computer into a MR tablet computer), documents (e.g., turning a real-world memo into a MR memo), and other objects into their VR environment. Although this disclosure describes a method of interacting with real-world objects by rendering MR objects while immersed in the VR environment, this disclosure contemplates incorporating real-world objects in the VR environment in any suitable manner.

In particular embodiments, one or more computing systems may display, for one or more displays of a virtual VR device, a first output image comprising a passthrough view of a real-world environment. The one or more computing systems may identify, using one or more images captured by one or more cameras of the VR display device, a real-world object in the real-world environment. The one or more computing systems may receive a user input indicating a first dimension corresponding to the real-world object. The one or more computing systems may automatically determine, based on the first dimension, a second and third dimension corresponding to the real-world object. Then, the one or more computing systems may render, for the one or more displays of the VR display device, a second output image of a VR environment. The VR environment may comprise a MR object that corresponds to the real-world object. The MR object may be defined by the determined first, second, and third dimensions.

Certain technical challenges exist for interacting with MR objects in VR environments. One technical challenge may include bringing real-world objects into a VR environment. The solution presented by the embodiments disclosed herein to address this challenge may be to adapt and integrate real-world objects in a real-world environment as MR objects in a VR environment. Another technical challenge may include conveying spatial information about the real-world environment and real-world objects within the real-world environment to a user while the user is immersed in a VR experience. The solution presented by the embodiments disclosed herein to address this challenge may be to render MR objects in the VR environment that correspond to real-world objects within the real-world environment so the user can ascertain where they are in the real-world environment, without greatly disrupting the immersion of the VR environment. Additionally, the solutions presented by the embodiments disclosed herein to address this challenge may be to render a passthrough view of the real-world environment within the VR environment to help a user identify real-world objects that may cause injury to the user if the user is not made aware of the presence of the real-world objects.

Certain embodiments disclosed herein may provide one or more technical advantages. A technical advantage of the embodiments may include providing a quick glimpse of the real-world environment through a passthrough view of the real-world environment while immersed in the VR environment. Another technical advantage of the embodiments may include providing spatial information by allowing the user to quickly toggle between a VR environment and a real-world environment. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
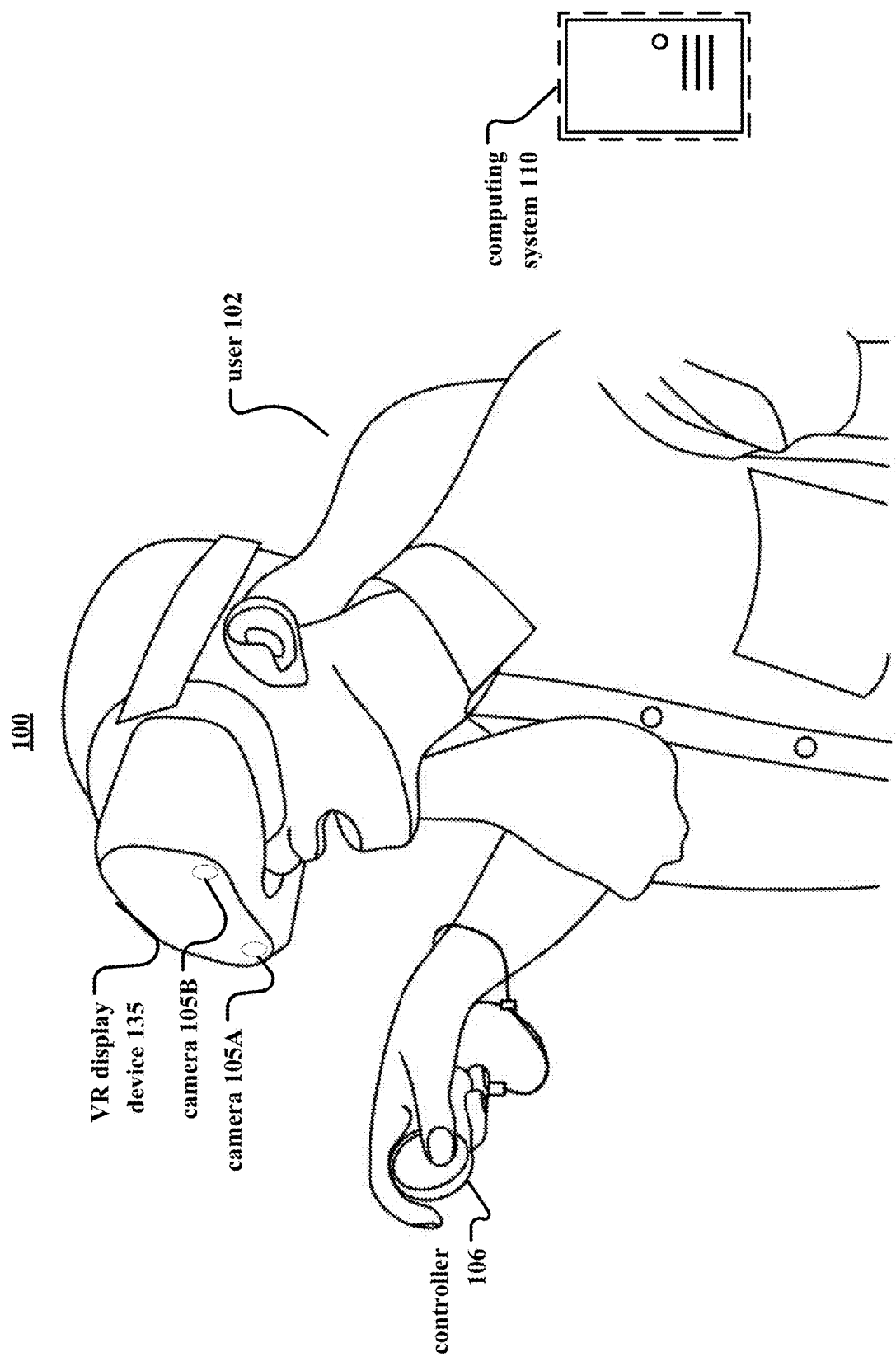
FIG. 1 illustrates an example VR system worn by a user, in accordance with particular embodiments.

In particular embodiments, a user of an immersive virtual reality (VR) system (e.g., head-mounted VR goggles) may have their view of the real-world environment partially or fully occluded by the VR system, and thus risk running into or hitting real-world objects while immersed in a VR environment. Additionally, immersion in the VR environment may disorient the user as to their position and/or orientation in the real-world environment. That is, the user may forget the direction where furniture or other objects in their vicinity are. Thus, one technical challenge may include interacting with real-world objects while the user is in an immersive VR experience. Traditional methods of keeping the user safe and helping the user orient themselves in a VR environment include drawing a virtual boundary, which defines a safe zone for the user while they are in the VR experience. As the user approaches the virtual boundary, a virtual boundary wall may appear or activate. These virtual boundary walls may have grid-like appearances. But these virtual boundary walls may break the immersion of the VR environment, may inhibit the use of a real-world space while immersed in the VR experience, and may detract from the user's experience. One solution presented by the embodiments disclosed herein to address the technical challenge of interacting with real-world objects while the user is in an immersive VR experience may be to provide a passthrough view of the real-world environment within the VR environment to identify real-world objects that can be incorporated into the VR environment, and render in the VR environment a mixed reality (MR) object that corresponds to the real-world object. A technical advantage of the embodiments may include incorporating real-world objects as MR objects that the user can interact with while in the VR environment. As an example and not by way of limitation, a user may identify a real-world desk in the real-world environment, determine the dimensions of the desk, and render a MR desk corresponding to the real-world desk for the user to interact with while immersed in the VR environment, where the MR desk may be defined by the dimensions of the real-world desk. This may allow the user to incorporate real-world objects into their VR environment, thus expanding the space the user can safely explore while immersed in the VR environment. Additionally, the user may be able to use the MR objects to help determine their pose (e.g., position and orientation) in the real-world environment while immersed in the VR environment, for example, by incorporating familiar real-world furniture, walls, electronic devices (e.g., turning a real-world tablet computer into a MR tablet computer), documents (e.g., turning a real-world memo into a MR memo), and other objects into their VR environment. Although this disclosure describes a method of interacting with real-world objects by rendering MR objects while immersed in the VR environment, this disclosure contemplates incorporating real-world objects in the VR environment in any suitable manner.

FIG. 1 illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). As illustrated in FIG. 1, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding him, as his vision is shielded by the VR display device 135. As such, the passthrough feature described herein may be technically advantageous for providing the user with real-time visual information about his physical surroundings.

Figure 2:
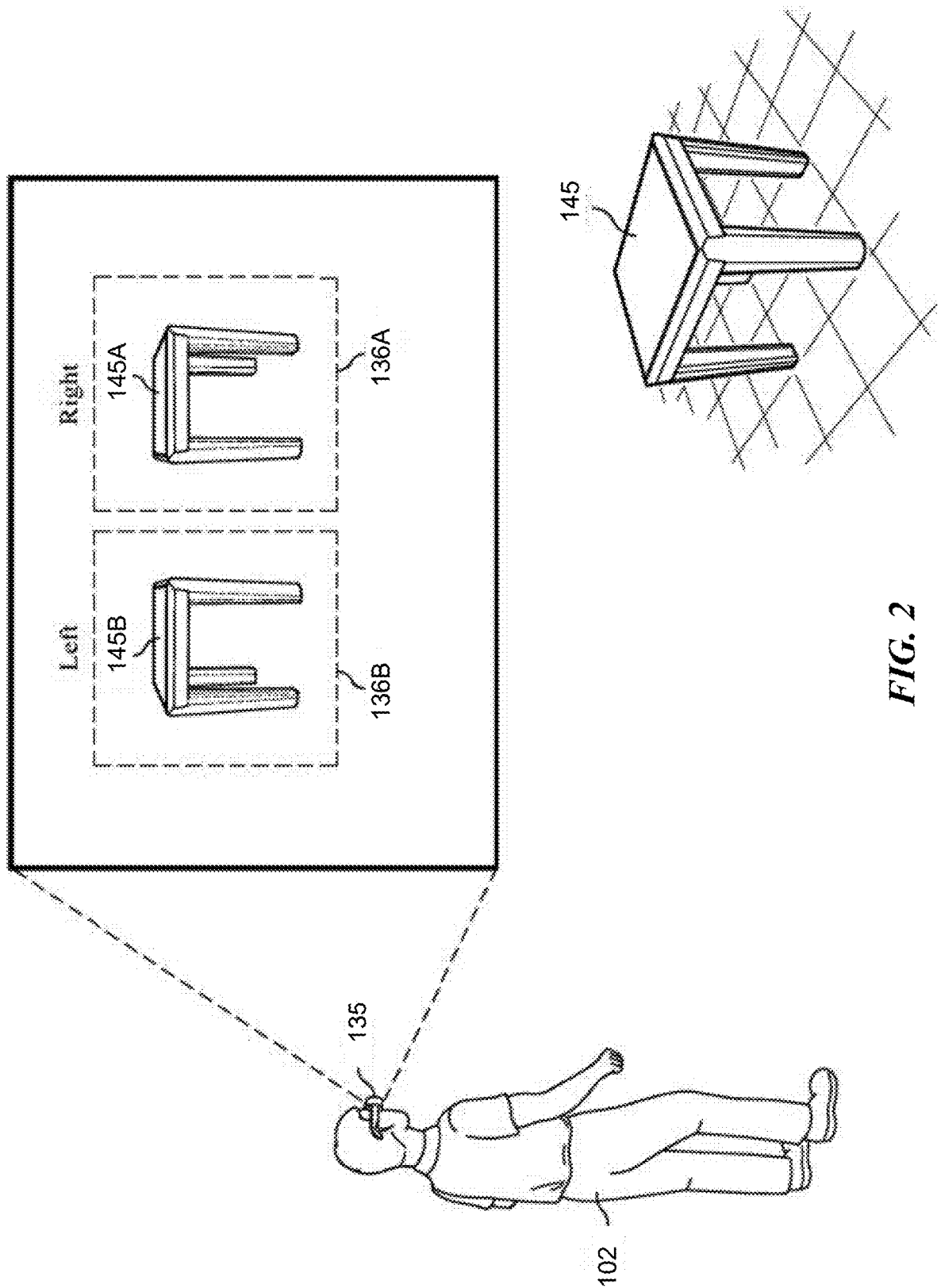
FIG. 2 illustrates an example of a passthrough feature, in accordance with particular embodiments.

FIG. 2 illustrates an example of the passthrough feature. A user 102 may be wearing a VR display device 135 and immersed within a VR environment. A real-world object 145 may be in the physical environment surrounding the user 102. However, due to the VR display device 135 blocking the vision of the user 102, the user 102 may be unable to directly see the real-world object 145. To help the user perceive their physical surroundings while wearing the VR display device 135, the passthrough feature captures information about the physical environment using, for example, one or more cameras 105 such as external-facing cameras 105A-B. The captured information may then be re-projected to the user 102 based on his viewpoints. In particular embodiments where the VR display device 135 has a right display 136A for the user's right eye and a left display 136B for the user's left eye, the virtual reality system 100 may individually render (1) a re-projected view 145A of the physical environment for the right display 135A based on a viewpoint of the user's right eye and (2) a re-projected view 145B of the physical environment for the left display 135B based on a viewpoint of the user's left eye.

Referring again to FIG. 1, the VR display device 135 may have external-facing cameras, such as the two forward-facing cameras 105A and 105B shown in FIG. 1. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, the virtual reality system 100 could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include a one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 3:
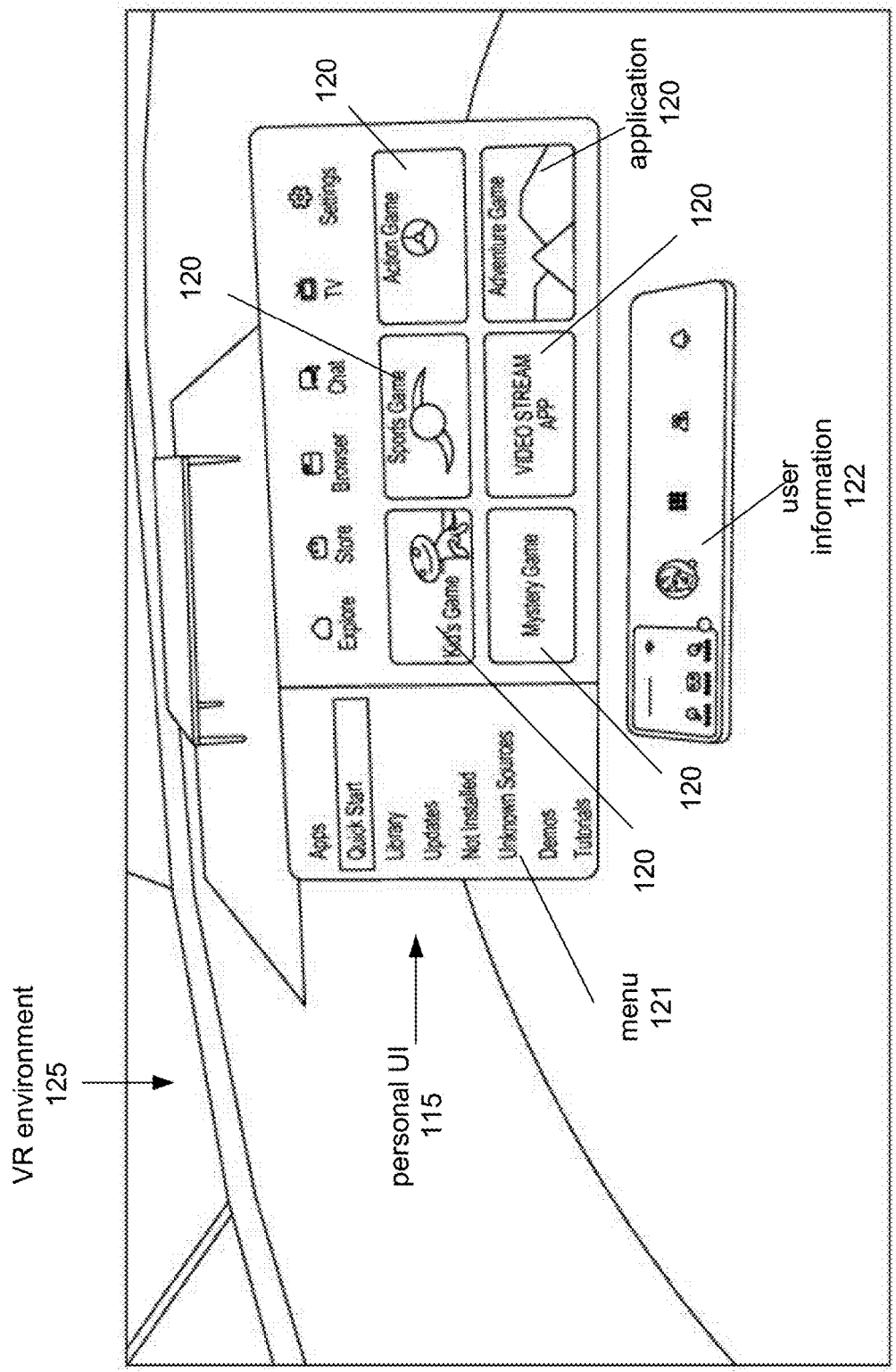
FIG. 3 illustrates an example view of a personal UI in a VR environment.

FIG. 3 illustrates an example view of a personal user interface (UI) 115 in a VR environment 125. In particular embodiments, the one or more computing systems 110 may render, for the one or more displays of the VR display device 135, a personal UI 115. The personal UI 115 may appear as an interface for the user 102 wearing the VR display device 135, as shown in FIGS. 1 and 2. The personal UI 115 may display one or more applications 120, menu 121, user information 122, and other features or attributes for the user to select. The personal UI 115 may appear as a floating virtual object that appears before the user in both the VR environment 125 and the real-world environment 130 (not illustrated). The personal UI 115 may allow the user to perform functions in both the VR environment 125 and the real-world environment 130 (via a passthrough view). The personal UI 115 may allow the user to interact with real-world objects and MR objects. For example, the user may use the personal UI 115 to identify a real-world object 145 (e.g., via a passthrough view). Within the VR environment 125, the personal UI 115 may be rendered as a virtual object proximate to a user of the VR display device 135. The personal UI 115 may move corresponding to the user's movement. That is, the personal UI 115 may remain proximate to the user as the user moves (e.g., the personal UI 115 may remain in a field of view of the user). For example, as the user moves forward, the personal UI 115 may move forward as well. If the user turns, the personal UI 115 may also turn to remain proximate to the user. The personal UI may have one or more attributes that adapt with respect to the MR object 165, such as a form factor and a set of user functionalities (discussed in greater detail below).

Figure 4:
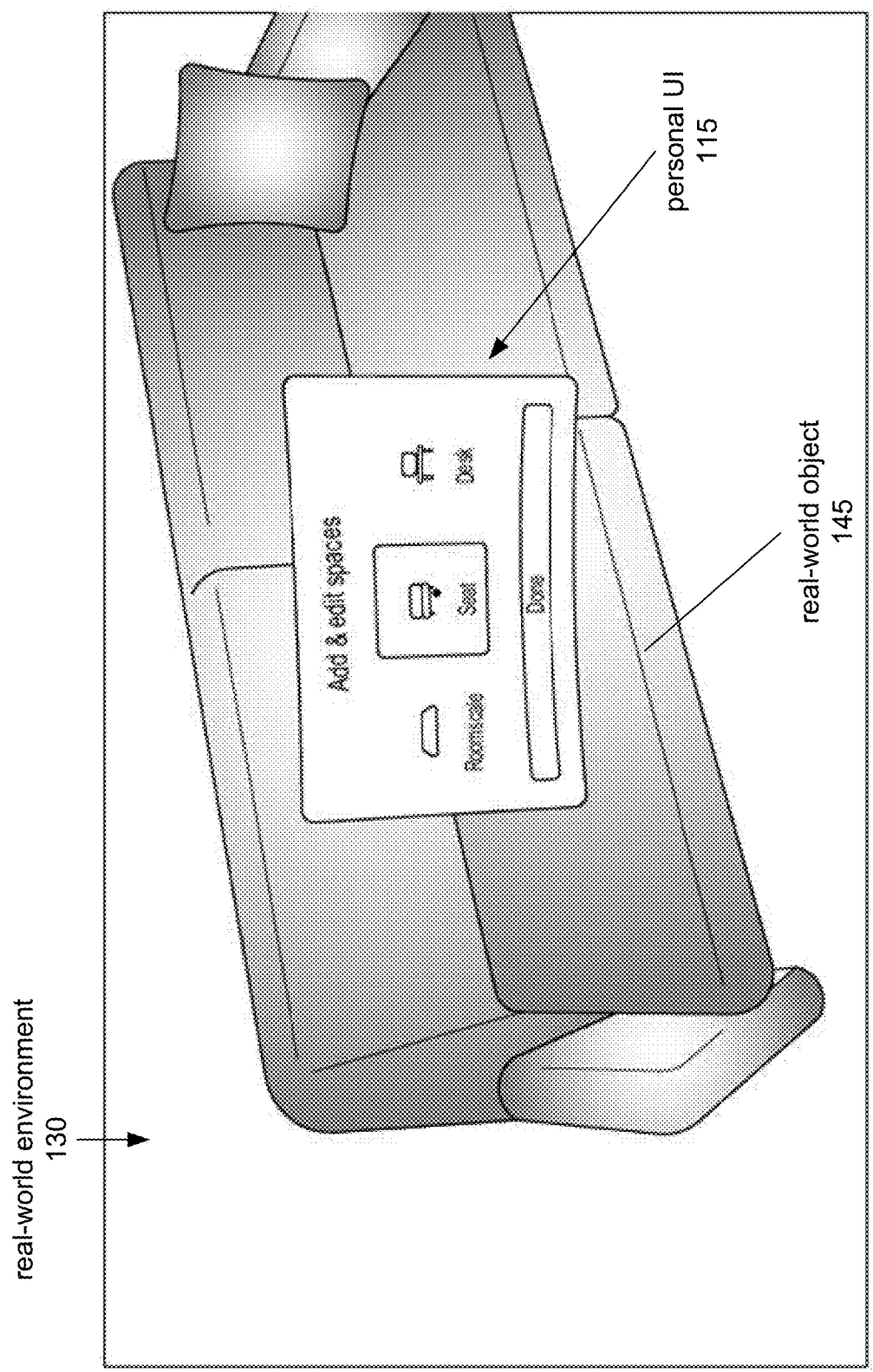
FIG. 4 illustrates an example view of using a VR display device to identify a real-world object.

FIG. 4 illustrates an example view of using a VR display device 135 to identify a real-world object 145. The real-world object 145 may appear in a real-world environment 130, for example as rendered in a passthrough view of the real-world environment 130. The passthrough view may be provided using one or more cameras 105 of the VR display device 135. The personal UI 115 may provide the user one or more options for identifying the real-world object 145. For example and not by way of limitation, the personal UI 115 may show options to edit the space of the VR environment by having the user define a roomscale space, to define a seat, or to define a desk.

In particular embodiments, the one or more computing systems 110 may render, for one or more displays of a VR display device 135, a first output image comprising a passthrough view of a real-world environment 130. The first output image may render the first output image of the real-world environment 130 by using the one or more cameras 105 of the VR display device 135 to provide the passthrough view of the real-world environment 130. As an example and not by way of limitation, the one or more computing systems 110 may show to the user wearing the VR display device 135, via a passthrough view, the real-world environment 130, which may contain one or more real-world objects 145. The passthrough view of the real-world environment 130 may be captured using the one or more cameras 105. Although this disclosure describes rendering an output image comprising a passthrough view of a real-world environment 130, this disclosure contemplates rendering an output image in any suitable manner.

In particular embodiments, the one or more computing systems 110 may identify, using one or more images captured by one or more cameras 105 of the one or more displays of the VR display device 135, a real-world object 145 in the real-world environment 130. The one more images captured by the one or more cameras 105 may provide the user a view (e.g., a passthrough view) of the real-world environment 130 (e.g., the user's living room) with the one or more real-world objects 145 (e.g., furniture such as couches and desks, and other objects). As an example and not by way of limitation, the computing system 110 may show a passthrough view of the real-world environment 130 containing the real-world object 145 (such as a couch). The user may use the personal UI 115 to select the type of real-world object 145 to be identified. For example, the user may use the personal UI 115 to identify a roomscale space (such a room in the real-world environment 130), a seat space (such as a couch or a chair), and a desk space (such as a desk or a table). Although this disclosure describes identifying real-world objects in a particular manner, this disclosure contemplates identifying real-world objects in any suitable manner.

Figure 5:
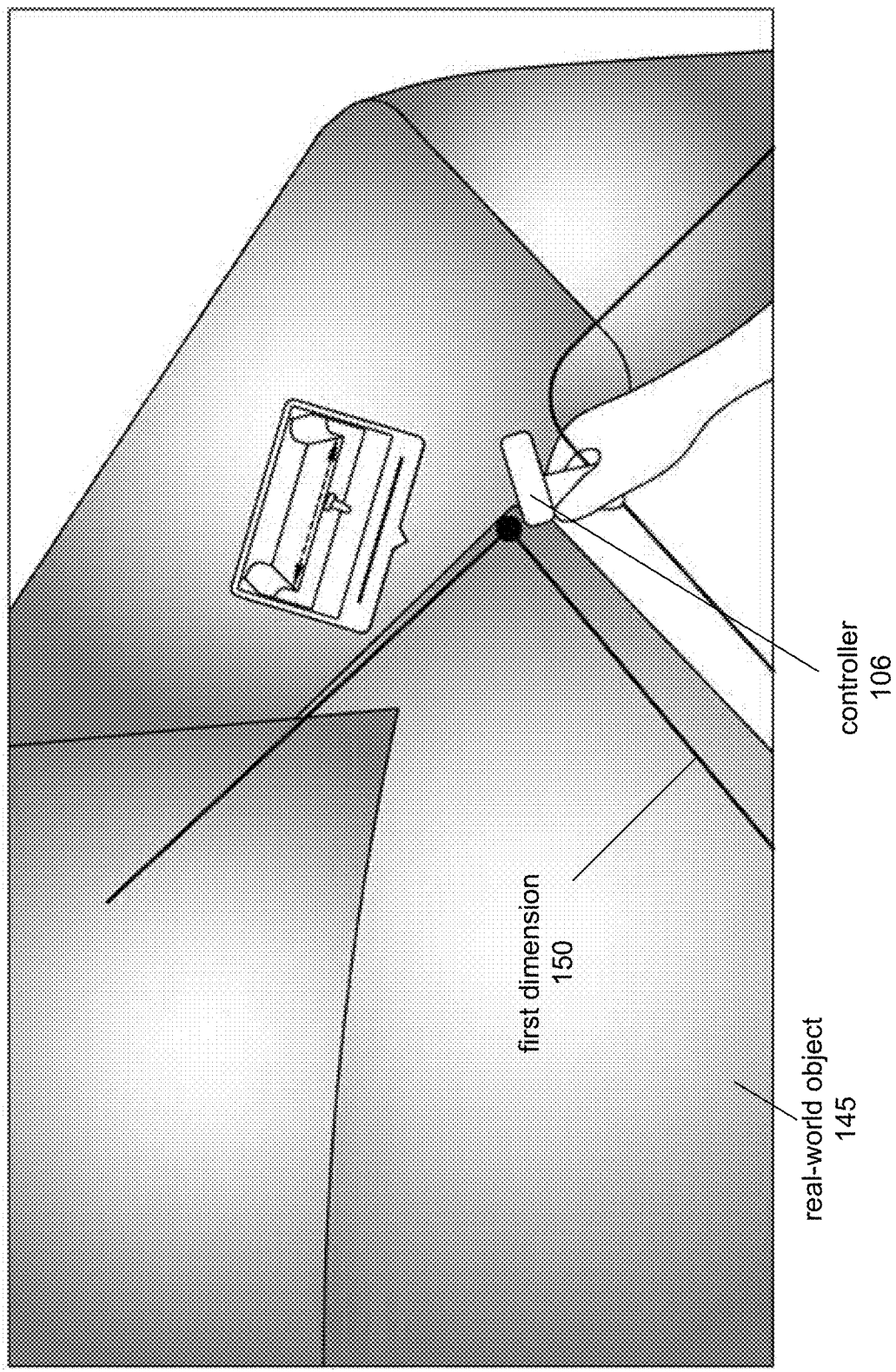
FIG. 5 illustrates an example view of indicating a first dimension of a real-world object.

FIG. 5 illustrates an example view of indicating a first dimension 150 of a real-world object 145. A user may draw a line corresponding to a first dimension 150 of a real-world object 145 (e.g., a couch) by drawing a line that defines a length of the couch. The user may draw the line using a controller 106. The one or more computing systems 110 may also automatically determine the first dimension 150 (e.g., a length of the couch) and the user can confirm or edit the first dimension 150.

In particular embodiments, the one or more computing systems 110 may receive a first user input indicating a first dimension 150 corresponding to the real-world object 145. For example, the one or more computing systems 110 may receive a measurement of the first dimension 150 of the real-world object 145 as measured by a user (e.g. by the user using the controller 106). The dimension (e.g., the first dimension 150) may correspond to a height, width, length, radius, circumference, or other form of dimensional measurement of the real-world object 145. The first dimension 150 corresponding to the real-world object 145 may also be automatically determined using one or more sensors of the VR display device (e.g., measurement sensors, camera sensors, etc.). The first dimension 150 corresponding to the real-world object 145 may also be semi-automatically determined, e.g., by automatically measuring the first dimension 150 using one or more sensors, and having the user confirm or edit the measurement. The user input indicating the first dimension 150 of the real-world object 145 may be a virtual line created by a user of the VR display device 135 within the VR environment defining an edge of the real-world object 145. As an example and not by way of limitation, the user may use the controller 106 to measure a first dimension 150 of the real-world object 145, such as the front edge of a couch. The user input indicating the first dimension of the real-world object may be two virtual points created by a user of the VR display device 135 within the VR environment 125 defining endpoints of a virtual line corresponding to an edge of the real-world object 145. As an example and not by way of limitation, the user may define a first endpoint of the first dimension (e.g., a left corner front edge of a couch) and the user may define a second endpoint of the first dimension (e.g., a right corner front edge of the couch), and a virtual line can be automatically drawn between the first and the second endpoints that define a dimension (e.g., the first dimension 150) of the couch. That is, the user may measure from one end of the couch to the other end of the couch, to define the first dimension 150 of a surface where the user is able to sit. As another example, the first dimension 150 may correspond to a height, width, length, or other dimensional measurement of a desk. Although this disclosure describes receiving a first user input indicating a first dimension corresponding to a particular manner, this disclosure contemplates receiving an input indicating a first dimension corresponding to a real-world object in any suitable manner.

Figure 6:
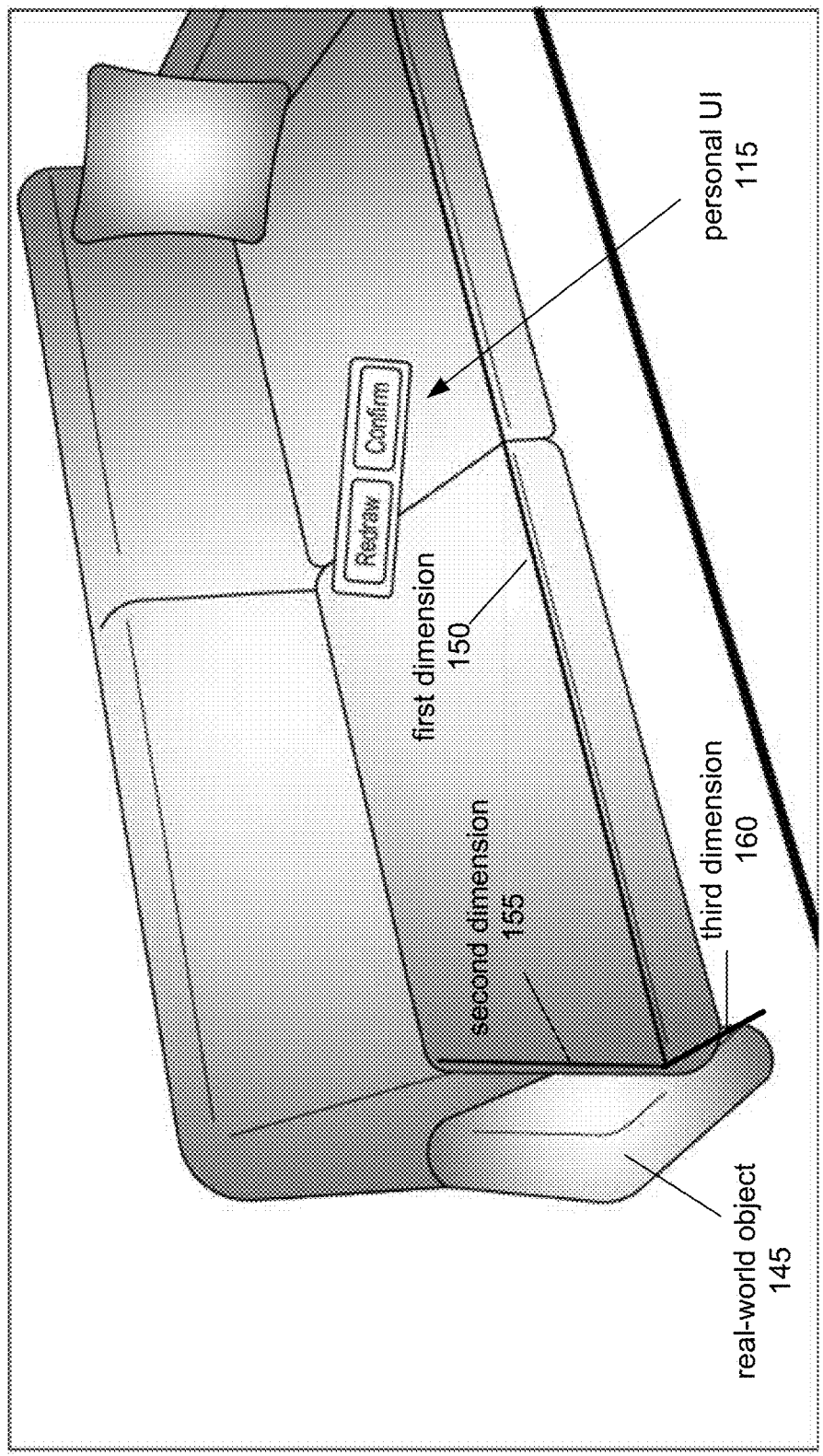
FIG. 6 illustrates an example view of determining a second and third dimension of a real-world object.

FIG. 6 illustrates an example view of determining a second dimension 155 and a third dimension 160 of a real-world object 145. After receiving the first dimension 150 of the real-world object 145 (e.g., the length of a couch), the computing system may determine the second dimension 155 and the third dimension 160 of the real-world object 145 (e.g., the height and width of the couch) automatically using one or more sensors of the VR display device, or by having the user define the second and third dimensions (e.g., by using the controller 106 to define the second and third dimensions). Once the first, second, and third dimensions are determined, the personal UI 115 can provide the user an input to confirm the determined dimensions, or provide the user an input to redraw or redefine the first, second, and/or third dimensions.

In particular embodiments, the one or more computing systems 110 may automatically determine, based on the first dimension 150, a second dimension 155 and a third dimension 160 corresponding to the real-world object 145. The one or more computing systems may automatically extrapolate, based on the first dimension 150, what the second dimension 155 and the third dimension 160 may be. The second dimension 155 and the third dimension 160 may be automatically determined using one or more sensors of the VR display device 135 (e.g., camera sensor, depth perception sensor, etc.) or by using an edge detection filter. The second dimension 155 and the third dimension 160 may semi-automatically determined (e.g., one or more sensors determine the second dimension 155 and the third dimension 160, and the dimensions are confirmed by the user). Semi-automatically determining the second and third dimensions may also entail defining a predetermined second and third dimension, where the user then adjusts the predetermined second and third dimensions to match the actual dimensions. In particular embodiments, the user defines each dimension (e.g., the user uses the controller 106 to define each of the first, second, and third dimensions). If the first dimension 150 corresponds to the length of the real-world object 145, then the second dimension may correspond to a width of the real-world object 145, and the third dimension may correspond to a height of the real-world object 145. As an example and not by way of limitation, if the one or more computing systems 110 receive an indication of a first dimension 150 corresponding to the real-world object 145 (e.g., a length of a couch), then the one or more computing systems 110 may automatically determine the second and third dimensions (e.g., the height and width) of the couch. Although this disclosure describes determining a second and third dimension in a particular manner, this disclosure contemplates determining a second and third dimension in any suitable manner.

Figure 7:
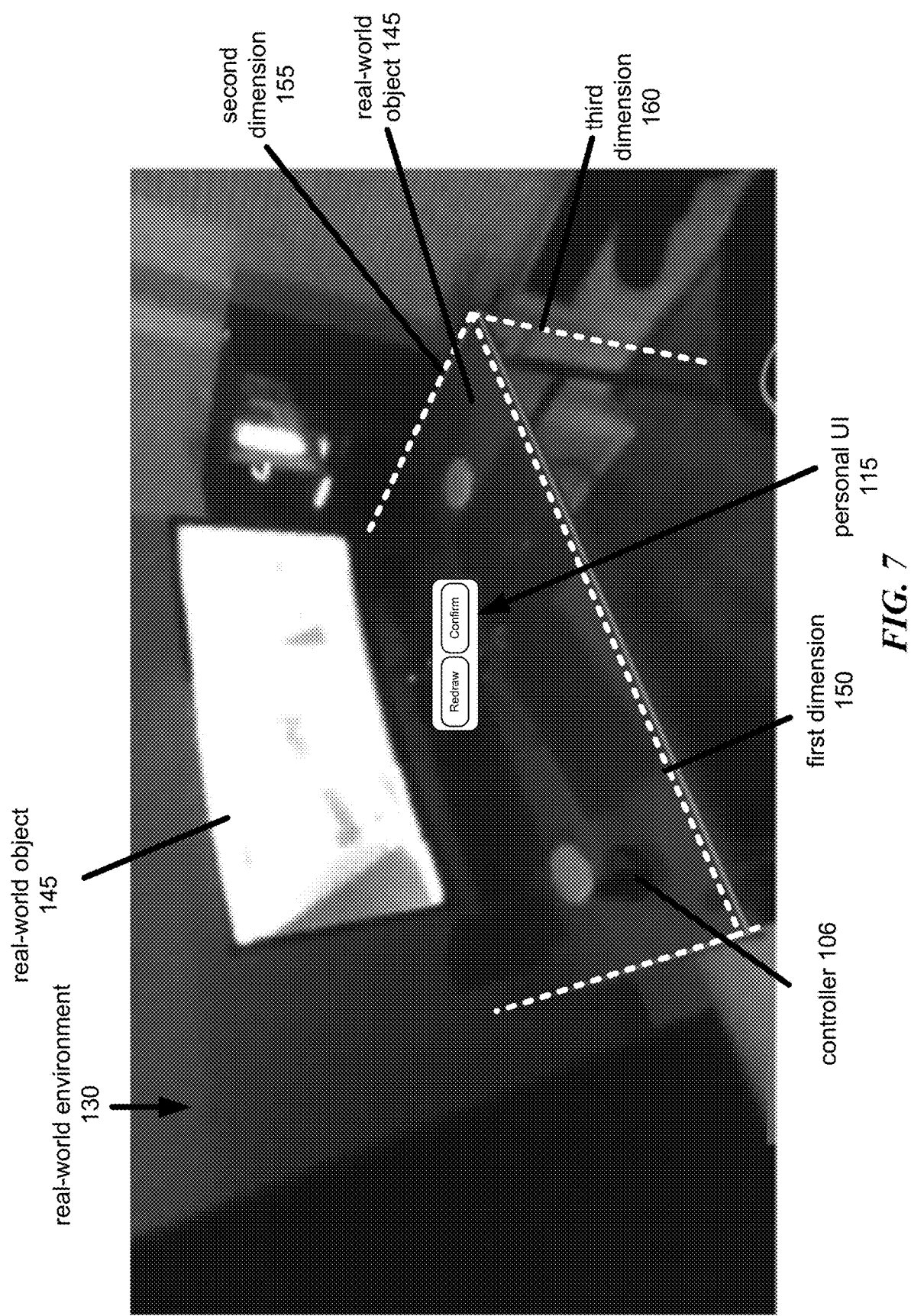
FIG. 7 illustrates an example view determining a first dimension, a second dimension, and a third dimension of a real-world object in a real-world environment using a controller.
Figure 8:
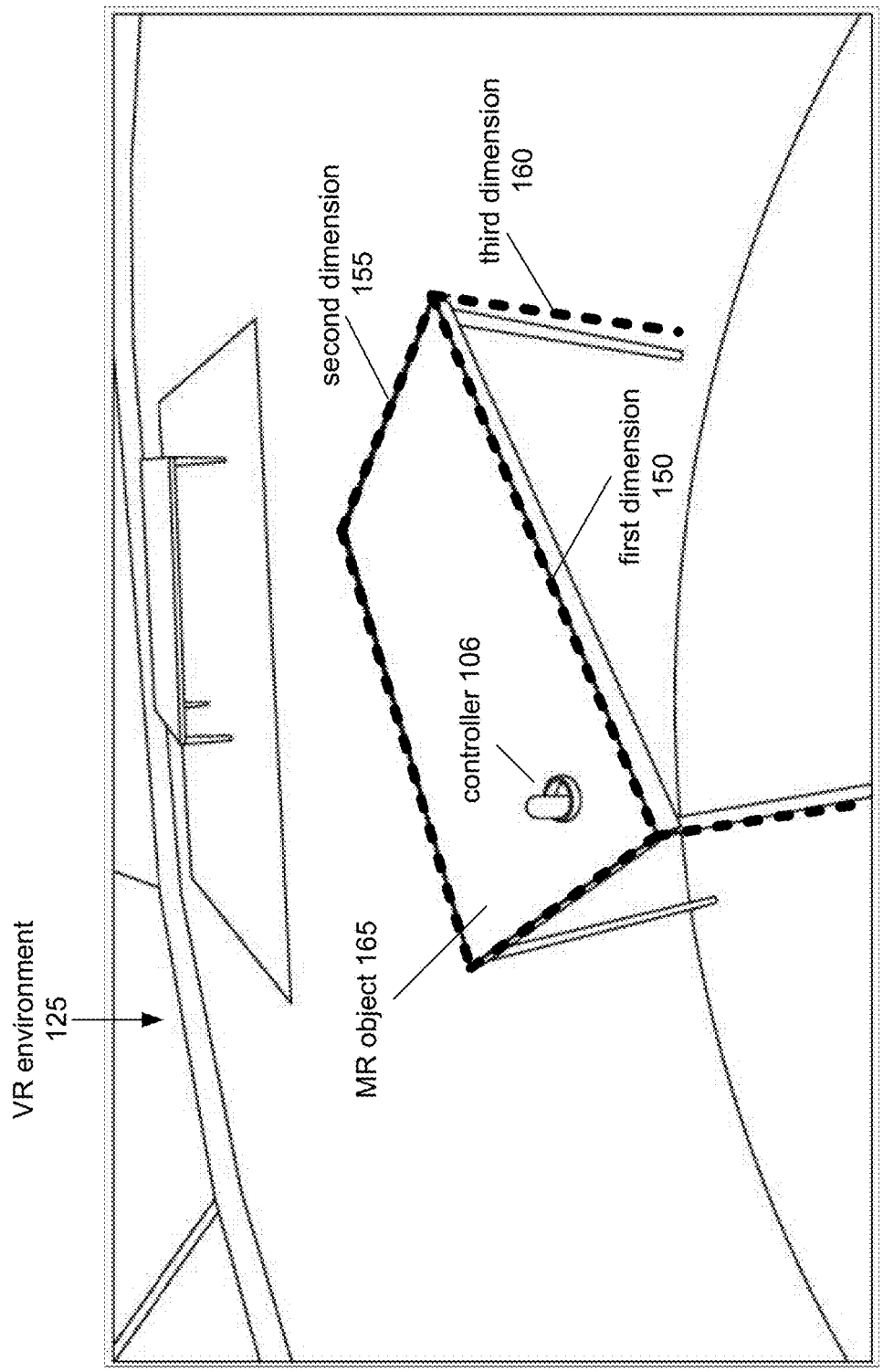
FIG. 8 illustrates an example view of a VR environment with a MR object corresponding to a real-world object.

FIG. 7 illustrates an example view of determining a first dimension, a second dimension, and a third dimension of a real-world object in a real-world environment using a controller. FIG. 8 illustrates an example view of a VR environment with a MR object corresponding to a real-world object. In particular embodiments, the user input indicating a dimension (e.g., the first dimension 150) of the real-world object 145 is a single virtual point created by a user of the VR display device 135 within the VR environment 125 defining a surface of the real-world object 145. The virtual point may be created using a controller 106. The controller 106 may be used to determine the first dimension 150, the second dimension 155, and the third dimension 160 of the real-world object 145. As an example and not by way of limitation, the user can place the controller 106 on a surface of the real-world object 145 (e.g., the user can place the controller on a planar surface of a real-world desk), and the one or more computing systems 110 can determine, based on the position of the controller 106, the first, second, and third dimensions of the real-world object 145. The one or more computing systems can determine one or more of the dimensions based on the location of the controller on the real-world object 145, and automatically extrapolate the dimensions of the real-world object 145 to render a second output image of the VR environment 125 with the MR object 165 corresponding to the real-world object 145 and defined by the first dimension 150, second dimension 155, and third dimension 160 of the real-world object 145.

In particular embodiments, the VR system 100 may automatically detect potential MR objects 165. For example, real-world objects 145 may be automatically detected and rendered as MR objects 165. The VR system 100 can automatically identify real-world objects to be rendered as MR objects 165, and the user can confirm whether or not the real-world objects 145 are to be rendered as MR objects 165. For example, the potential MR object 165 can be rendered as a "lucid" (e.g., opaque, colored, or ghostly) outline of the real-world object 145, and the user can render the real-world object 145 as a MR object 165 by pointing, clicking on (via the controller 106), touching, or otherwise indicating the real-world object 145 the user would like to render as a MR object 165.

Figure 9:
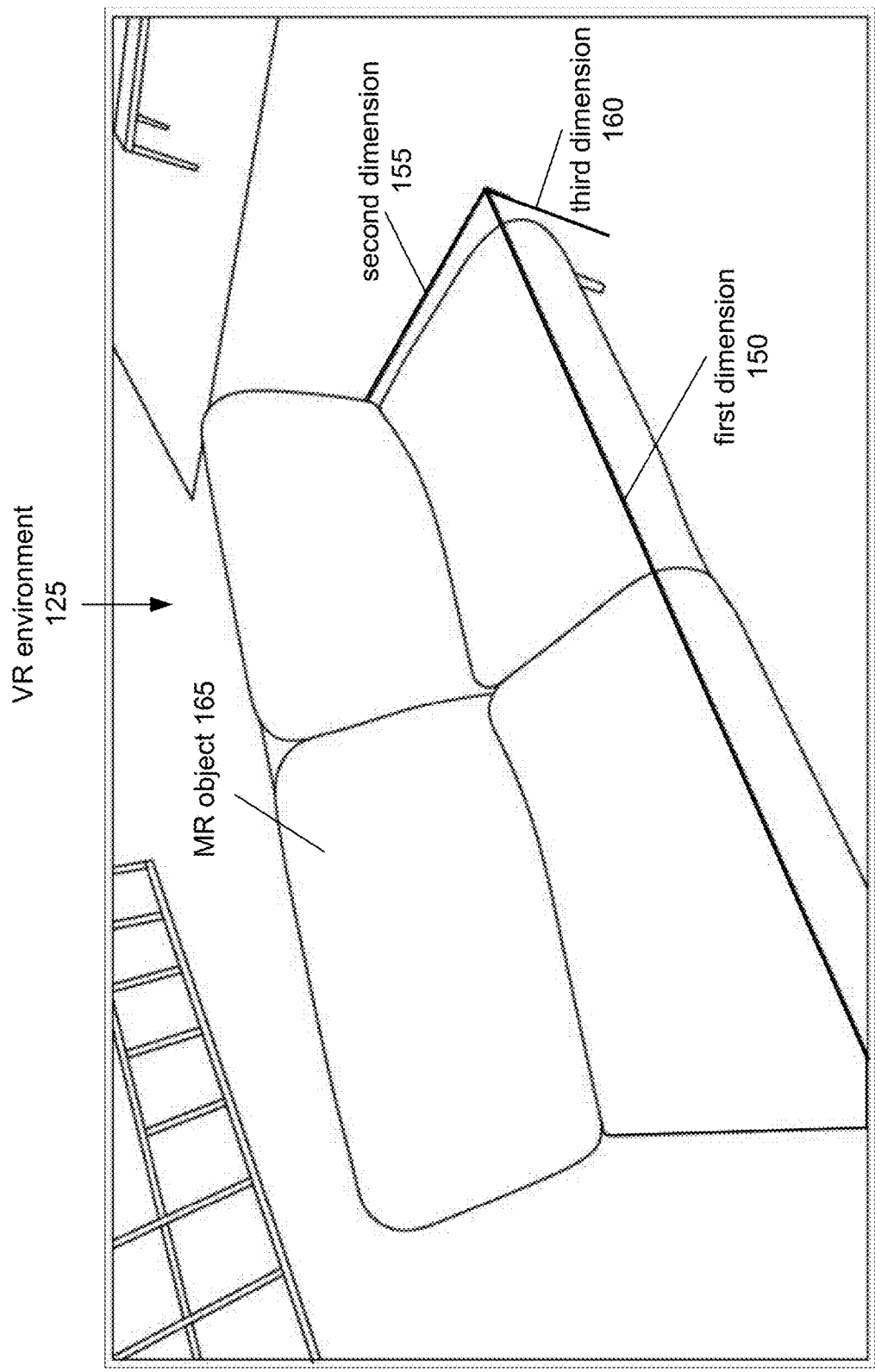
FIG. 9 illustrates an example view of a VR environment with a MR object corresponding to a real-world object.

FIG. 9 illustrates an example view of a VR environment 125 with a MR object 165 corresponding to a real-world object 145. The VR environment may contain one or more objects such as MR objects 165, which may have the same dimensions as the real-world object 145 (e.g., the real-world object 145 as illustrated in FIGS. 4-6). The pose (e.g., position and orientation) of the MR object 165 in the VR environment 125 may correspond to the pose of the real-world object 145 in the real-world environment 130. That is, if the user is standing in the same pose in the VR environment 125 and the real-world environment 130, the pose of the MR object 165 will correspond to the pose of the real-world object 145.

One technical challenge may include bringing real-world objects 145 into a VR environment 125. One solution disclosed herein to address this challenge may be to adapt and integrate real-world objects 145 in a real-world environment 130 as MR objects 165 in a VR environment 125. In particular embodiments, the one or more computing systems 110 may render, for the one or more displays of the VR display device 135, a second output image of a VR environment 130. The VR environment 125 may comprise one or more MR objects 165 that correspond to real-world objects 145. The MR object 165 may be defined by the determined first dimension 150, the determined second dimension 155, and the determined third dimension 160 (e.g., the MR object 165 may have the same dimensions as the real-world object 145 illustrated in FIGS. 4-6). That is, using the determined first dimension 150, the determined second dimension 155, and the determined third dimension 160 of the real-world object 145, the one or more computing systems 110 may render for the one or more displays of the VR display device 135 a rendering of the MR object 165 that is constructed using and based on dimensions and/or pose of the real-world object 145. As an example and not by way of limitation, after determining the dimensions of the real-world object 145 (e.g., the real-world couch), the one or more computing systems 110 may render a MR object 165 (e.g., a MR couch) in the VR environment 125 that corresponds to the dimensions of the real-world object 145 (e.g., has substantially the same shape and size of the real-world object 145). Thus, when the user is immersed in the VR environment 125 and goes to sit on the MR couch, they will know they are sitting on a real-world couch in the real-world environment 130. Although this disclosure describes rendering a second output image comprising a MR object in a particular manner, this disclosure contemplates rendering a second output image in any suitable manner.

Figure 10:
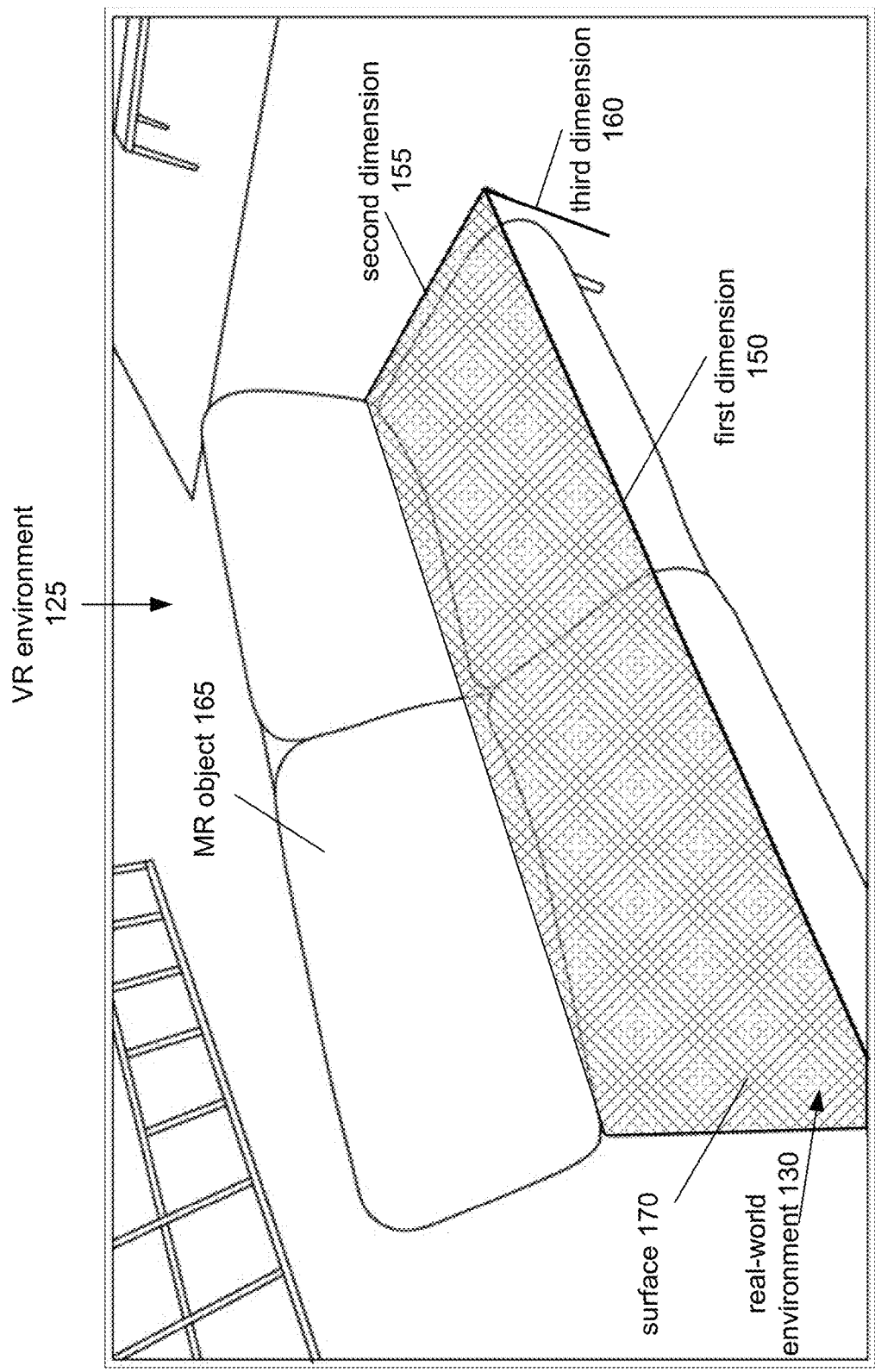
FIG. 10 illustrates an example view of a VR environment with a portion of a MR object having a passthrough view of a real-world environment.

FIG. 10 illustrates an example view of a VR environment 125 with a portion of a MR object 165 having a passthrough view of a real-world environment 130. In particular embodiments, the one or more computing systems 110 may receive a second user input indicating a selection to view the portion of the passthrough view of the MR object 165. A third output image may be rendered responsive to receiving the second user input indicating the selection to view the portion of the passthrough view of the MR object 165. That is, the VR display device 135 may show a portion of the rendered MR object 165 (such as a surface 170 of the rendered MR object 165) as a passthrough view of the corresponding real-world object 145 in the real-world environment 130. As shown in FIG. 10, the surface 170 may be defined by two or more of the determined dimensions (e.g., the surface 170 in FIG. 10 is defined by the first dimension 150 and the second dimension 155, which defines the seat surface of the couch). As an example and not by way of limitation, as a user approaches the MR object 165 (e.g., a MR couch based on a real-world couch in the real-world environment 130) the one or more computing systems 110 may render a passthrough view showing the real-world environment 130. The one or more computing systems 110 may render a lucid view (e.g., rendered as an opaque or colored outline) of the real-world object 145. As such, the user can check to make sure the surface of the couch the user may plan on sitting on is free of obstructions or objects. A technical advantage may include providing a quick glimpse of the real-world environment 130 through a passthrough view of the real-world environment 130 while the user is still immersed in the VR environment 125. Thus, for example, if the user has a pet that jumped onto the couch while the user was immersed in the VR experience, the user can make sure the couch is clear of pets before sitting down. As another example and not by way of limitation, the user may view a portion of a MR desk as a passthrough view of the real-world desk in the real-world environment 130, to ensure the desk is clear of objects that the user's hands may knock over while immersed in the VR experience. Although this disclosure describes rendering a third output image in a particular manner, this disclosure contemplates rendering a third output image in any suitable manner.

A technical challenge may include conveying spatial information about the real-world environment 130 and real-world objects 145 within the real-world environment 130 to a user while the user is immersed in a VR experience. The solution disclosed herein to address this challenge may be to render MR objects 165 in the VR environment 125 that correspond to real-world objects 145 within the real-world environment 130 so the user can ascertain where they are in the real-world environment 130, without greatly disrupting the immersion of the VR environment 125. Additionally, the solutions presented by the embodiments disclosed herein to address this challenge may be to render a passthrough view of the real-world environment within the VR environment to help a user identify real-world objects that may cause injury to the user if the user is not made aware of the presence of the real-world objects. In particular embodiments, the one or more computing systems 110 may receive a second user input indicating a selection to view the portion of the passthrough view of the MR object 165, and render the third output image responsive to receiving the second user input indicating the selection to view the portion of the passthrough view of the MR object 165. For example, the user may select (e.g., may select a button on the personal UI 115) to view a passthrough view of the MR object 165. The user may indicate (e.g., via a button on the personal UI 115) to view the surface or seat of the couch as a passthrough view of the real-world environment 130, while maintaining the rendering of the VR environment 125 everywhere else. Thus, the user can ensure the MR object 165 corresponding to the real-world object 145 is clear of obstacles or other objects.

In particular embodiments, the one or more computing systems 110 may determine the MR object 165 object is centered on a field of view of a user of the VR display device 135 for a threshold time period, and render the third output image responsive to determining that the MR object 165 is centered on the field of view of the user for the threshold time period. That is, if the MR object 165 is centered on the field of view of the user for a predetermined period of time or is centered on the field of view of the user for a predetermined period of time, a portion of the MR object 165 may be rendered as a passthrough view of the corresponding real-world object 145 in the real-world environment 130. For example, if the user is looking at a MR couch for a predetermined period of time (e.g., 5 seconds), the one or more computing systems may automatically show a passthrough view of the surface 170 of the couch to allow the user to make sure there are no objects the user may damage by using the couch, or to make sure there are no objects that may cause injury to the user if the user sits on the couch before making sure the couch is clear of objects.

In particular embodiments, the one or more computing systems 110 may determine whether a user of the VR display device 135 has approached within a threshold distance of the real-world object 145, and render the third output image responsive to determining the user has approached within the threshold distance of the real-world object 145. That is, if the user gets close to the MR object 165, a portion of the MR object 165 may be rendered as a passthrough view of the corresponding real-world object 145 in the real-world environment 130. For example, as the user approaches the MR object 165 (e.g., the couch), the one or more computing systems 110 may determine that the user is within a threshold distance of the real-world object 145, e.g., within 1 meter of the real-world object 145. After determining the user is within the threshold distance, the one or more computing systems 110 may automatically show a passthrough view of the surface 170 of the couch to allow the user to make sure there are no objects the user may damage by using the couch, or to make sure there are no objects that can cause injury to the user if the user sits on the couch before making sure the couch is clear of objects.

In particular embodiments, the one or more computing systems 110 may determine whether the MR object 165 is in a field of view of a user of the VR display device 135, and render the third output image responsive to determining the MR object 165 is in the field of view of the user. That is, if the user glances at the MR object 165, a portion of the MR object 165 may be rendered as a passthrough view of the corresponding real-world object 145 in the real-world environment 130. The portion of the passthrough view may be rendered to quickly provide the user a preview of MR objects 165 that the user may interact with. Thus, the user may quickly determine whether an object in the VR environment 130 is a MR object 165 that the user may interact with, and if the MR object 165 is safe to interact with (e.g., is free of other objects that may cause harm to the user if not cleared from the MR object 165).

In particular embodiments, the one or more computing systems 110 may determine whether an object has newly appeared on the real-world object 145 that corresponds to the MR object 165. For example, if a user has rendered the MR object 165 based on the real-world object 145 (e.g., a couch), and the user's pet has subsequently jumped onto the couch, an object detection filter may be employed to identify the new object (e.g., the pet) that is on the real-world couch. The user can then be alerted to the presence of the new object using the passthrough view to show the object on the real-world couch, or by rendering the new object as a lucid object (e.g., an opaque or colored outline of the object).

In particular embodiments, the one or more computing systems 110 may render, for the one or more displays of the VR display device 135, a virtual boundary corresponding to the real-world environment 130. The VR environment 125 may have a virtual boundary corresponding to the real-world environment 130. The virtual boundary may mark the edge of a safe area for the user to explore while immersed in the VR environment 125. As the user approaches the virtual boundary, a virtual boundary wall may appear or activate. These virtual boundary walls may have grid-like appearances that may disrupt the immersion while in the VR environment 125, detracting from the user's experience. For example, in a room-scale VR environment (where the user can walk around a room during the VR experience) the virtual boundary may correspond to real-world objects 145 (e.g., couches, chairs, tables, walls, impediments, etc.) that the user wearing the VR display device 135 would like to avoid. The virtual boundary may be defined by the user (e.g., by having the user manually draw the virtual boundary using the controller 106), automatically determined (e.g., an image processor may determine a safe boundary and automatically determines the boundary wall), or semi-automatically determined (e.g., an image processor may determine or suggest a safe boundary and the boundary wall, and the user may manually augment or edit the determined boundary wall).

In particular embodiments, the one or more computing systems 110 may extend the virtual boundary to include the identified real-world object 145 responsive to automatically determining the second dimension 155 and the third dimension 160 corresponding to the real-world object 145. That is, if the real-world object 145 lay outside the original virtual boundary defined by the user, then after determining the dimensions of the real-world object, the one or more computing systems 110 may extend the virtual boundary to include the real-world object 145. For example, if the user initially had the virtual boundary go to the edge of the real-world object (e.g., a couch), then after determining the dimensions of the couch, the virtual boundary may be extended to include the couch. Thus, the user will not see a virtual boundary wall as they approach or interact with the couch, reducing the disruption to immersion of the VR experience.

Figure 11A:
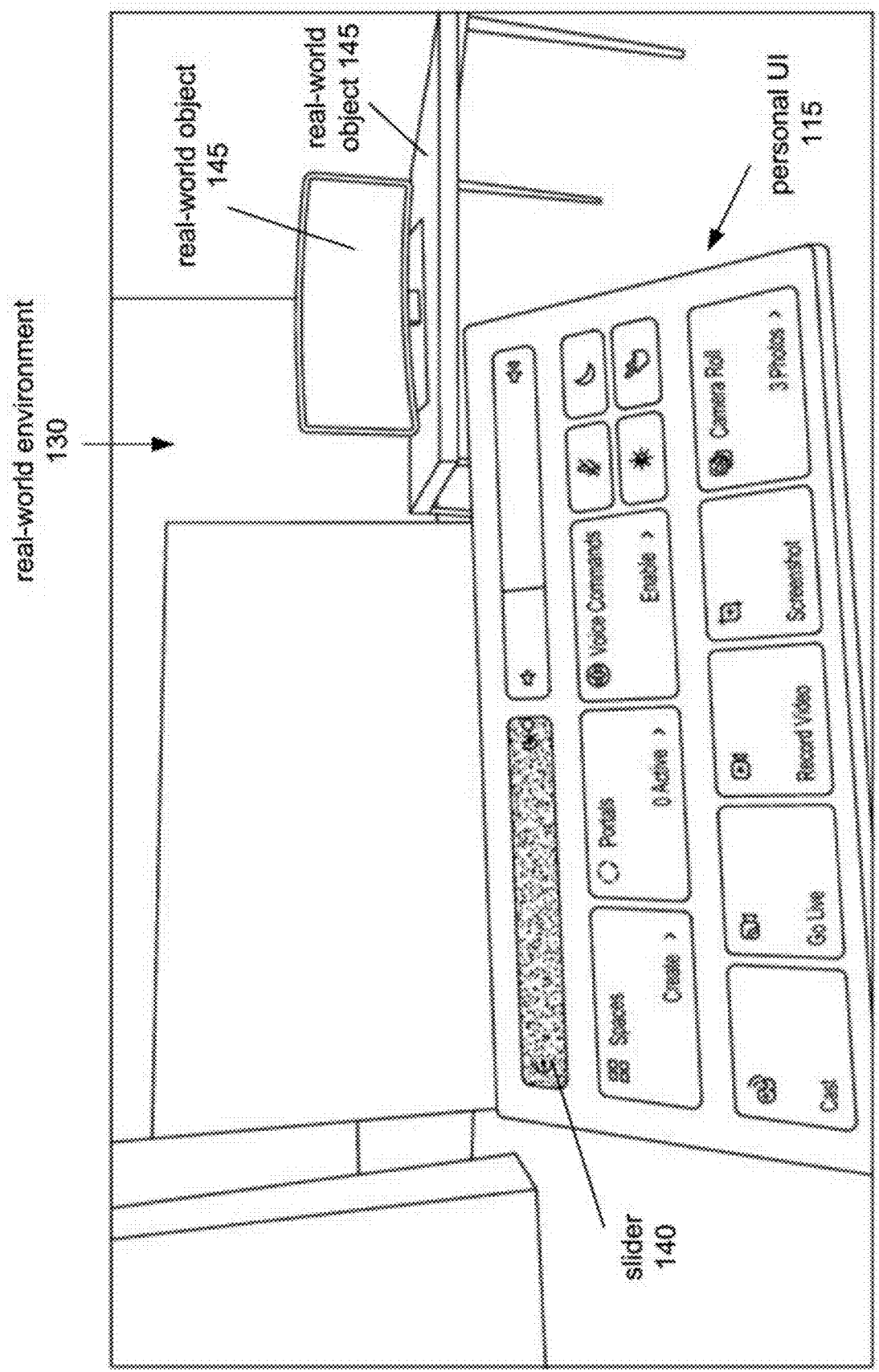
FIG. 11A illustrates an example view of a reality slider of a personal UI configured to show a real-world environment.
Figure 11B:
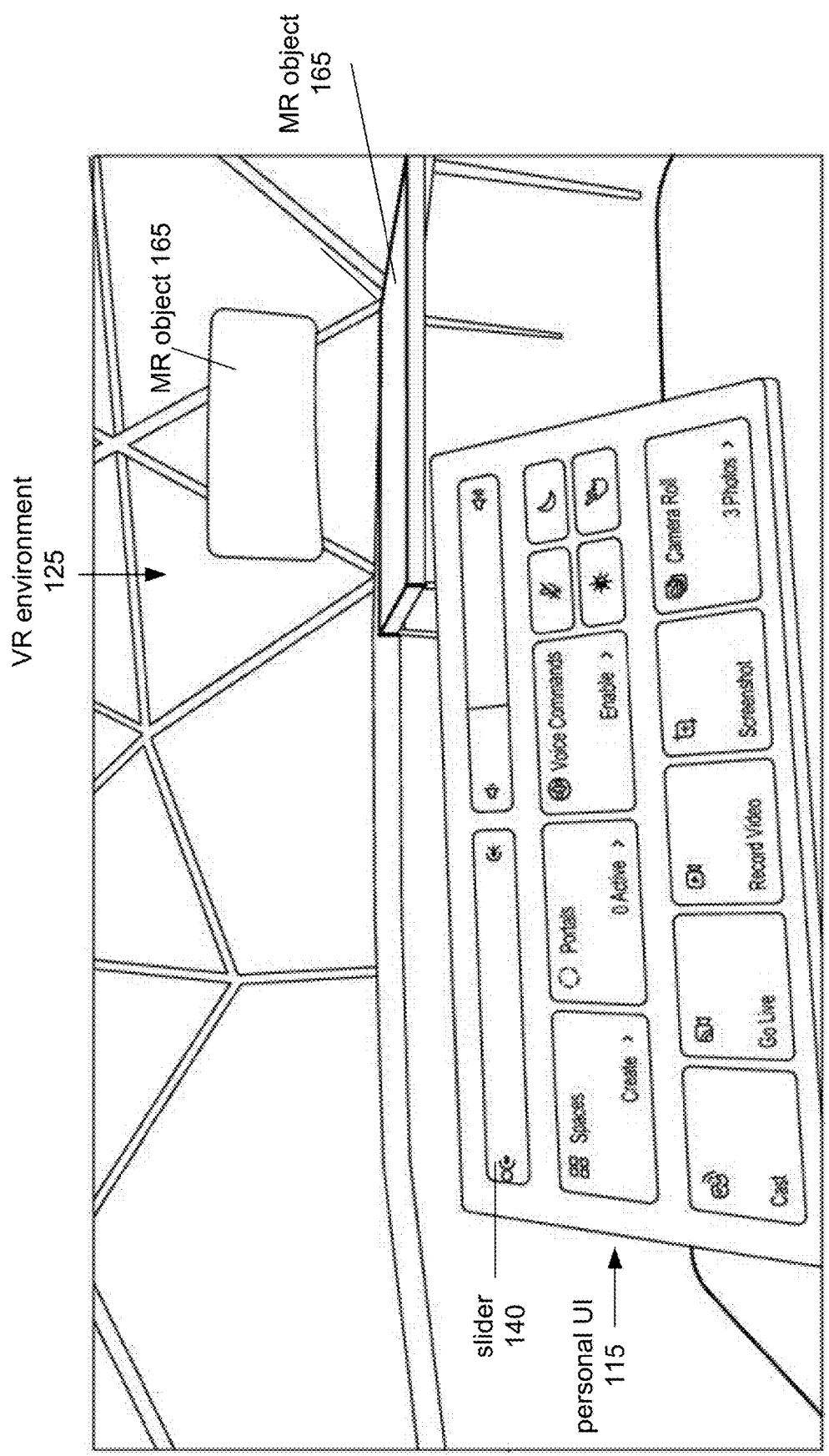
FIG. 11B illustrates an example view of a reality slider of a personal UI configured to show a VR environment.
Figure 12:
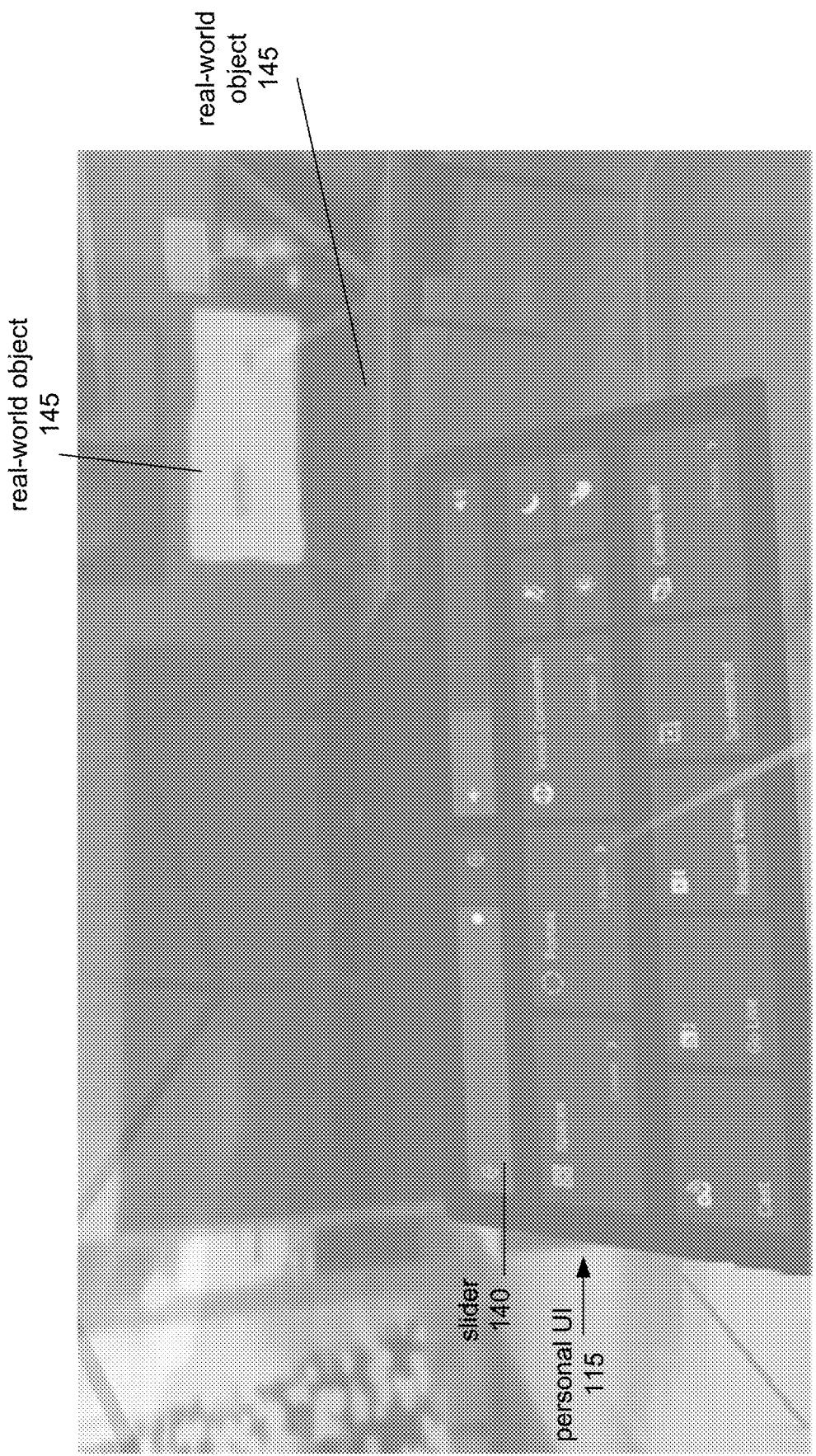
FIG. 12 illustrates an example view of a reality slider of a personal UI configured to show a transition between a real-world environment and a VR environment.

One of the features or attributes of the personal UI may be a switch, toggle, button, or slider to transition between the VR environment 125 and the real-world environment 130. FIG. 11A illustrates an example view of a reality slider 140 of a personal UI 115 configured to show a real-world environment 130. FIG. 11B illustrates an example view of a reality slider 140 of a personal UI 115 configured to show a VR environment 125. FIG. 12 illustrates an example view of a reality slider 140 of a personal UI 115 configured to show a transition between a real-world environment 130 and a VR environment 125. The reality slider 140 can be used to toggle between the real-world environment 130 and the VR environment 125. For example, if the reality slider 140 is all the way to the right (as in FIG. 11A), the VR display device 135 will render a view (e.g., a passthrough view) of the real-world environment 130. If the reality slider 140 is all the way to the left (as in FIG. 11B), the VR display device 135 will render a view of the VR environment 125. The reality slider can be toggled to display a blend of the VR environment 125 and the real-world environment 130. For example, if the reality slider is somewhere in the middle of the reality slider bar (as in FIG. 12), the VR display device 135 may render a blur or other form of transition between the VR environment 125 and the real-world environment 130. That is, the VR environment 125 may come in as an opaque rendering in the real-world environment 130 or the real-world environment 130 may come in as an opaque rendering in the VR environment 125. A technical advantage of the embodiments may include providing spatial information by allowing the user to quickly toggle between the VR environment 125 and the real-world environment 130.

Figure 13:
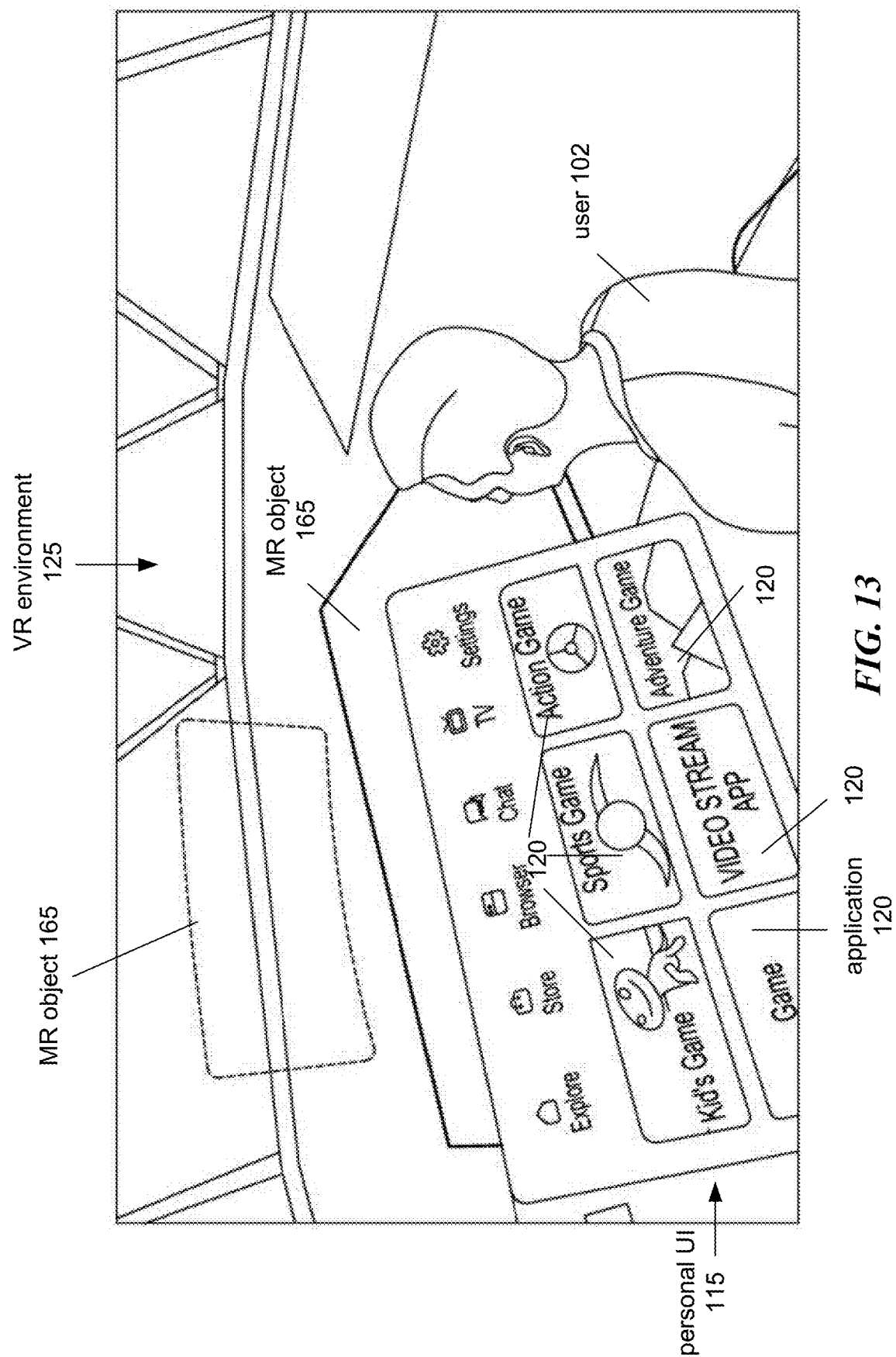
FIG. 13 illustrates a third person view of a user approaching a MR object.

FIG. 13 illustrates a third person view of a user 102 approaching a MR object 165 in the VR environment 125. The user 102 may approach the one or more MR objects 165 (e.g., a MR desk and a MR virtual screen). Proximate to the user 102 may be the personal UI 115. As stated above in the discussion of FIG. 3, the personal UI 115 may have one or more attributes. The attributes may adapt with respect to the MR object 165. For example, one of the attributes of the personal UI 115 may be a form factor of the personal UI 115 (e.g., an appearance or layout of the personal UI 115). The form factor of the personal UI 115 may take on different appearances or layouts based on a change in the user's environment or the user's wants and needs. A first form factor of the personal UI 115 may adapt to a second form factor of the personal UI 115 based on a proximity of the user 102 to the MR object 165. Another one of the attributes of the personal UI 115 may be a set of user functionalities of the personal UI. The set of user functionalities of the personal UI may change or adapt in response to a user selection to adapt the personal UI 115 or the user approaching the MR object 165. That is, a first set of user functionalities of the personal UI 115 may to a second set of user functionalities of the personal UI based on a proximity of the user to the MR object. For example, a first form factor of the personal UI may be a floating virtual object that is in front of and proximate to the user 102. A first set of user functionalities may include a first set of applications that may include, for example, entertainment focused functionalities such as video game applications 120 and video streaming applications 120. As the user approaches the MR object 165 (e.g., as the user approaches the MR desk), the attributes of the personal UI 115 may adapt to the MR object 165. The proximity of the user 102 to the MR object 165 may be measured by determining the user has approached within a threshold distance of the MR object 165. For example, the threshold distance may be 1 meter from the MR object 165. As the user approaches within the threshold distance, the one or more attributes of the personal UI 115 may adapt with respect to the MR object 165.

Figure 14:
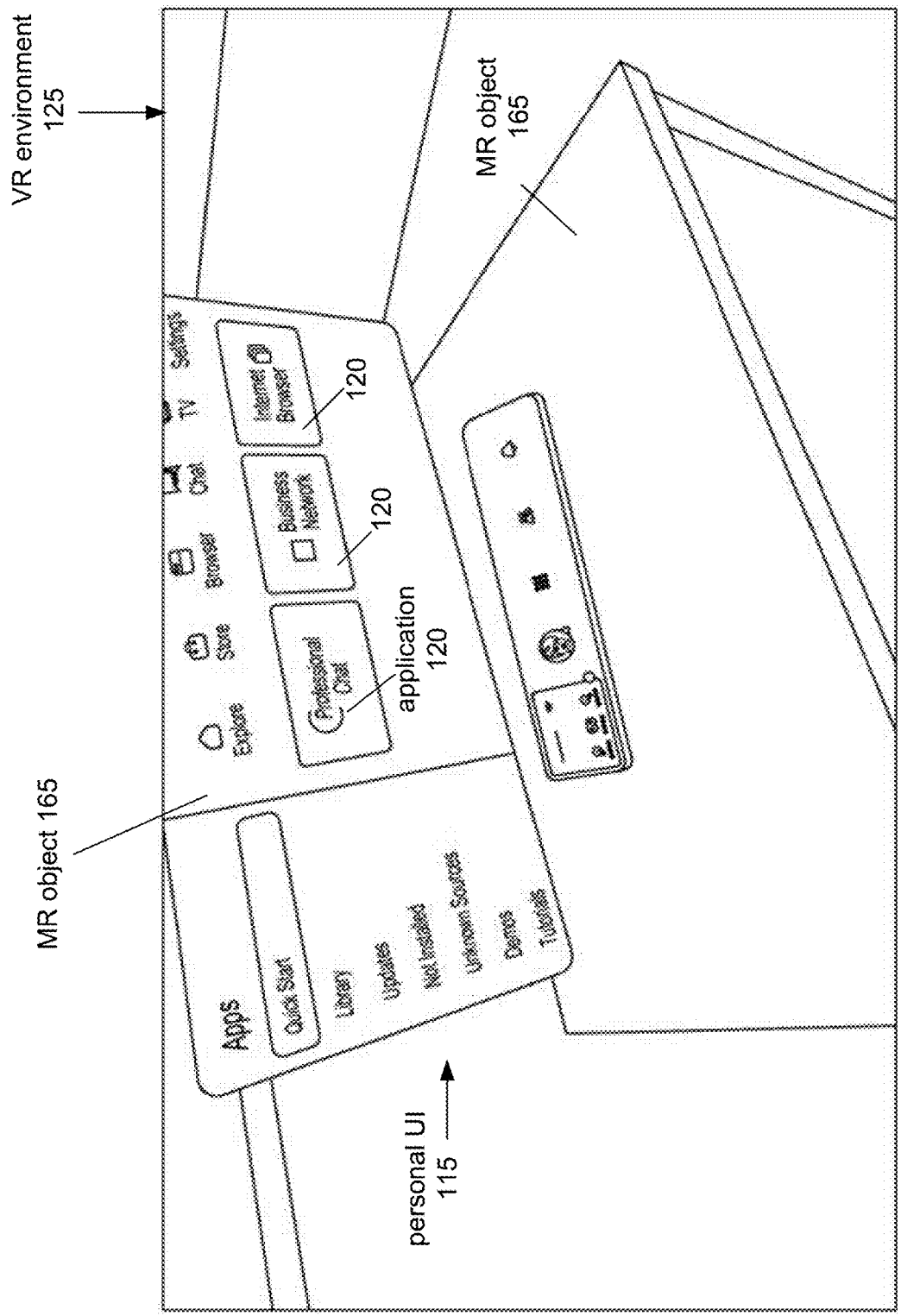
FIG. 14 illustrates a user perspective view of a user approaching a MR object.
Figure 15:
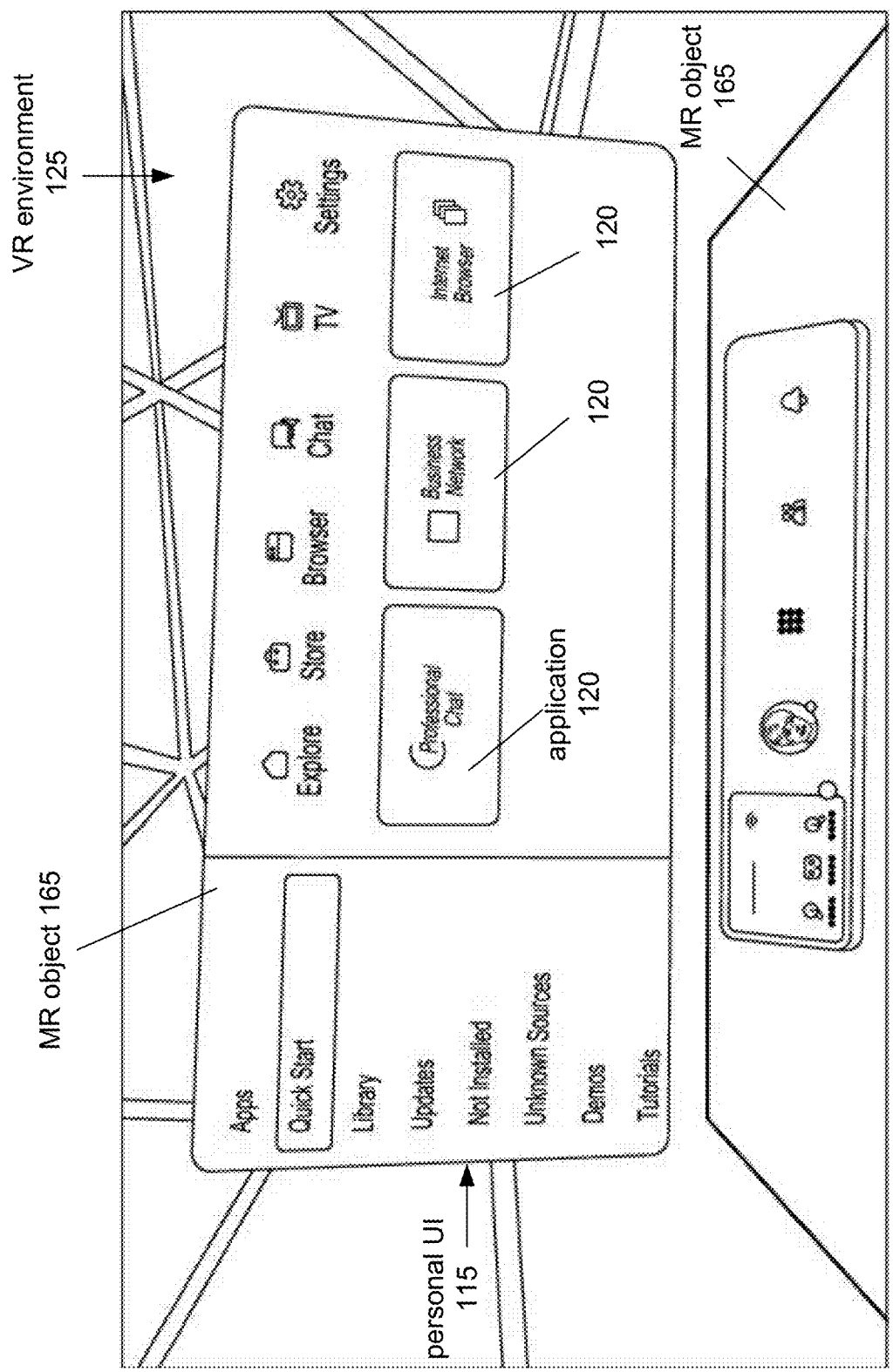
FIG. 15 illustrates a user perspective view of a user at a MR object.

FIG. 14 illustrates a user perspective view of a user 102 approaching a MR object 165. FIG. 15 illustrates a user perspective view of a user 102 at a MR object 165. As the user 102 gets closer to the MR object 165 (e.g., the MR desk), the personal UI 115 may adapt to the MR desk. The personal UI 115 may adapt by changing from a first form factor to a second form factor. For example, the first form factor of the personal UI (e.g., a floating virtual object as seen in FIG. 13) may "snap" or affix itself to a MR object 165 (such as a MR screen that corresponds to a real-world screen in the real-world environment 130) or a VR object (such as a virtual screen on the MR desk). Thus, the personal UI 115 may have a second form factor that imitates a workplace monitor setup on a desk. Additionally, the first set of user functionalities (e.g., the gaming and streaming applications 120 as seen in FIG. 13) may adapt to a second set of functionalities (e.g., the work chat, business network, and internet browser applications 120 as seen in FIGS. 14 and 15). That is, the set of functionalities may adapt to the MR object by detecting that when the user 102 is at the MR desk, the user enters a "work" mode. Thus, the set of functionalities can adapt from entertainment (e.g., games, streaming, etc. applications) to work-related applications (such as work chat, business network, etc. applications). As another example and not by way of limitation, if the user 102 approaches a MR couch, the second form factor of the personal UI 115 may appear as a movie-theater screen or wide-screen television, with a second set of functionalities geared towards entertainment-related applications (such as gaming or streaming applications).

In particular embodiments, the personal UI 115 may include a switch, toggle, button, or slider to transition between the different user functionalities. For example, there may be an icon on the personal UI 115 that, when selected, switches the form factor from a first form factor to a second form factor. There may be an icon on the personal UI that, when selected, switches from a first set of user functionalities (such as a set of work-related applications) to a second set of user functionalities (such as a set of entertainment-related applications).

Figure 16:
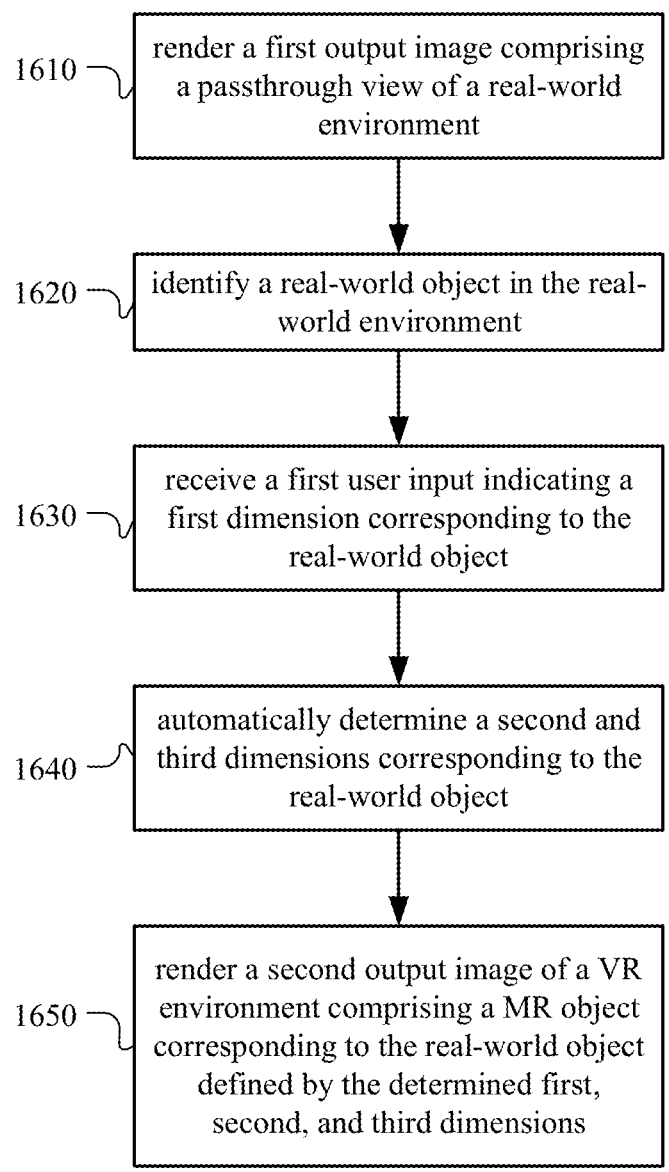
FIG. 16 illustrates an example method for interacting with MR objects in VR environments.

FIG. 16 illustrates an example method 1600 for interacting with MR objects in VR environments. The method may begin at step 1610, where one or more computing systems may render, for one or more displays of a VR display device, a first output image comprising a passthrough view of a real-world environment. At step 1620, the method may include identifying, using one or more images captured by one or more cameras of the one or more displays of the VR display device, a real-world object in the real-world environment. At step 1630, the method may include receiving a first user input indicating a first dimension corresponding to the real-world object. At step 1640, the method may include automatically determining, based on the first dimension, a second and third dimensions corresponding to the real-world object. At step 1650, the method may include rendering, for the one or more displays of the VR display device, a second output image of a VR environment. The VR environment may comprise a MR object corresponding to the real-world object. The MR object may be defined by the determined first, second, and third dimensions. Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for illustrates an example method 1600 for interacting with MR objects in VR environments including the particular steps of the method of FIG. 16, this disclosure contemplates any suitable method for illustrates an example method 1600 for interacting with MR objects in VR environments including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
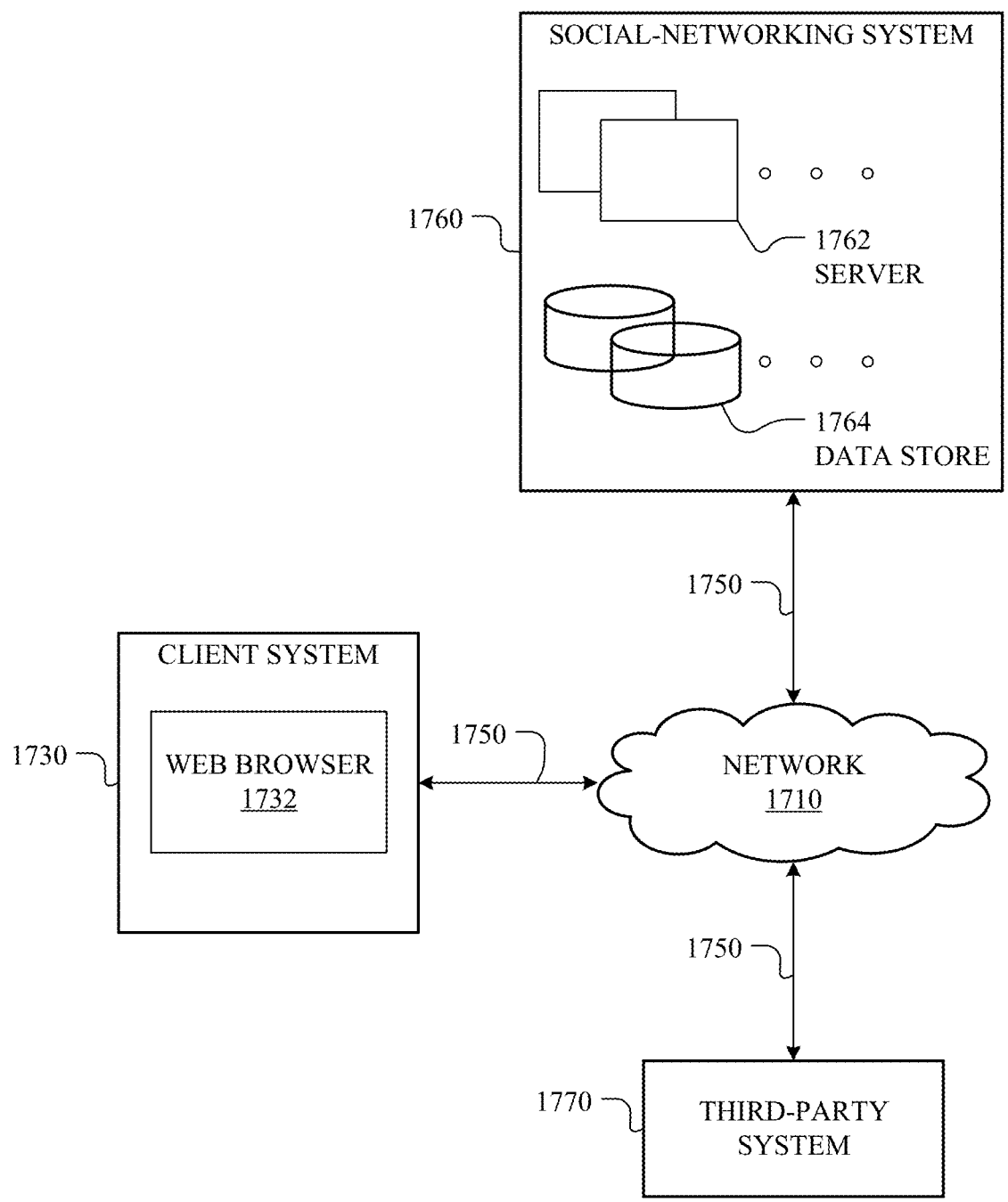
FIG. 17 illustrates an example network environment associated with a social-networking system.

FIG. 17 illustrates an example network environment 1700 associated with a VR or social-networking system. Network environment 1700 includes a client system 1730, a VR or social-networking system 1760, and a third-party system 1770 connected to each other by a network 1710. Although FIG. 17 illustrates a particular arrangement of client system 1730, VR or social-networking system 1760, third-party system 1770, and network 1710, this disclosure contemplates any suitable arrangement of client system 1730, VR or social-networking system 1760, third-party system 1770, and network 1710. As an example and not by way of limitation, two or more of client system 1730, VR or social-networking system 1760, and third-party system 1770 may be connected to each other directly, bypassing network 1710. As another example, two or more of client system 1730, VR or social-networking system 1760, and third-party system 1770 may be physically or logically co-located with each other in whole or in part. Moreover, although FIG. 17 illustrates a particular number of client systems 1730, VR or social-networking systems 1760, third-party systems 1770, and networks 1710, this disclosure contemplates any suitable number of client systems 1730, VR or social-networking systems 1760, third-party systems 1770, and networks 1710. As an example and not by way of limitation, network environment 1700 may include multiple client system 1730, VR or social-networking systems 1760, third-party systems 1770, and networks 1710.

This disclosure contemplates any suitable network 1710. As an example and not by way of limitation, one or more portions of network 1710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1710 may include one or more networks 1710.

Links 1750 may connect client system 1730, social-networking system 1760, and third-party system 1770 to communication network 1710 or to each other. This disclosure contemplates any suitable links 1750. In particular embodiments, one or more links 1750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1750, or a combination of two or more such links 1750. Links 1750 need not necessarily be the same throughout network environment 1700. One or more first links 1750 may differ in one or more respects from one or more second links 1750.

In particular embodiments, client system 1730 may be an electronic device including hardware, software, or embedded logic components or a combination of two or more such components and capable of carrying out the appropriate functionalities implemented or supported by client system 1730. As an example and not by way of limitation, a client system 1730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1730. A client system 1730 may enable a network user at client system 1730 to access network 1710. A client system 1730 may enable its user to communicate with other users at other client systems 1730.

In particular embodiments, client system 1730 (e.g., an HMD) may include a passthrough engine 1732 to provide the passthrough feature described herein, and may have one or more add-ons, plug-ins, or other extensions. A user at client system 1730 may connect to a particular server (such as server 1762, or a server associated with a third-party system 1770). The server may accept the request and communicate with the client system 1730.

In particular embodiments, VR or social-networking system 1760 may be a network-addressable computing system that can host an online Virtual Reality environment or social network. VR or social-networking system 1760 may generate, store, receive, and send social-networking data, such as, for example, user-profile data, concept-profile data, social-graph information, or other suitable data related to the online social network. Social-networking or VR system 1760 may be accessed by the other components of network environment 1700 either directly or via network 1710. As an example and not by way of limitation, client system 1730 may access social-networking or VR system 1760 using a web browser, or a native application associated with social-networking or VR system 1760 (e.g., a mobile social-networking application, a messaging application, another suitable application, or any combination thereof) either directly or via network 1710. In particular embodiments, social-networking or VR system 1760 may include one or more servers 1762. Each server 1762 may be a unitary server or a distributed server spanning multiple computers or multiple datacenters. Servers 1762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1762 may include hardware, software, or embedded logic components or a combination of two or more such components for carrying out the appropriate functionalities implemented or supported by server 1762. In particular embodiments, social-networking or VR system 1760 may include one or more data stores 1764. Data stores 1764 may be used to store various types of information. In particular embodiments, the information stored in data stores 1764 may be organized according to specific data structures. In particular embodiments, each data store 1764 may be a relational, columnar, correlation, or other suitable database. Although this disclosure describes or illustrates particular types of databases, this disclosure contemplates any suitable types of databases. Particular embodiments may provide interfaces that enable a client system 1730, a social-networking or VR system 1760, or a third-party system 1770 to manage, retrieve, modify, add, or delete, the information stored in data store 1764.

In particular embodiments, social-networking or VR system 1760 may store one or more social graphs in one or more data stores 1764. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1760 may provide users of the online social network the ability to communicate and interact with other users. In particular embodiments, users may join the online social network via social-networking or VR system 1760 and then add connections (e.g., relationships) to a number of other users of social-networking or VR system 1760 to whom they want to be connected. Herein, the term "friend" may refer to any other user of social-networking or VR system 1760 with whom a user has formed a connection, association, or relationship via social-networking or VR system 1760.

In particular embodiments, social-networking or VR system 1760 may provide users with the ability to take actions on various types of items or objects, supported by social-networking or VR system 1760. As an example and not by way of limitation, the items and objects may include groups or social networks to which users of social-networking or VR system 1760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 1760 or by an external system of third-party system 1770, which is separate from social-networking or VR system 1760 and coupled to social-networking or VR system 1760 via a network 1710.

In particular embodiments, social-networking or VR system 1760 may be capable of linking a variety of entities. As an example and not by way of limitation, social-networking or VR system 1760 may enable users to interact with each other as well as receive content from third-party systems 1770 or other entities, or to allow users to interact with these entities through an application programming interfaces (API) or other communication channels.

In particular embodiments, a third-party system 1770 may include one or more types of servers, one or more data stores, one or more interfaces, including but not limited to APIs, one or more web services, one or more content sources, one or more networks, or any other suitable components, e.g., that servers may communicate with. A third-party system 1770 may be operated by a different entity from an entity operating social-networking or VR system 1760. In particular embodiments, however, social-networking or VR system 1760 and third-party systems 1770 may operate in conjunction with each other to provide social-networking services to users of social-networking or VR system 1760 or third-party systems 1770. In this sense, social-networking or VR system 1760 may provide a platform, or backbone, which other systems, such as third-party systems 1770, may use to provide social-networking services and functionality to users across the Internet.

In particular embodiments, a third-party system 1770 may include a third-party content object provider. A third-party content object provider may include one or more sources of content objects, which may be communicated to a client system 1730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1760 also includes user-generated content objects, which may enhance a user's interactions with social-networking or VR system 1760. User-generated content may include anything a user can add, upload, send, or "post" to social-networking or VR system 1760. As an example and not by way of limitation, a user communicates posts to social-networking or VR system 1760 from a client system 1730. Posts may include data such as status updates or other textual data, location information, photos, videos, links, music or other similar data or media. Content may also be added to social-networking or VR system 1760 by a third-party through a "communication channel," such as a newsfeed or stream.

In particular embodiments, social-networking or VR system 1760 may include a variety of servers, sub-systems, programs, modules, logs, and data stores. In particular embodiments, social-networking or VR system 1760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 1760 may also include suitable components such as network interfaces, security mechanisms, load balancers, failover servers, management-and-network-operations consoles, other suitable components, or any suitable combination thereof. In particular embodiments, social-networking or VR system 1760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1760 to one or more client systems 1730 or one or more third-party system 1770 via network 1710. The web server may include a mail server or other messaging functionality for receiving and routing messages between social-networking or VR system 1760 and one or more client systems 1730. An API-request server may allow a third-party system 1770 to access information from social-networking or VR system 1760 by calling one or more APIs. An action logger may be used to receive communications from a web server about a user's actions on or off social-networking or VR system 1760. In conjunction with the action log, a third-party content-object log may be maintained of user exposures to third-party content objects. A notification controller may provide information regarding content objects to a client system 1730. Information may be pushed to a client system 1730 as notifications, or information may be pulled from client system 1730 responsive to a request received from client system 1730. Authorization servers may be used to enforce one or more privacy settings of the users of social-networking or VR system 1760. A privacy setting of a user determines how particular information associated with a user may be shared. The authorization server may allow users to opt in to or opt out of having their actions logged by social-networking or VR system 1760 or shared with other systems (e.g., third-party system 1770), such as, for example, by setting appropriate privacy settings. Third-party content-object stores may be used to store content objects received from third parties, such as a third-party system 1770. Location stores may be used for storing location information received from client systems 1730 associated with users. Advertisement-pricing modules may combine social information, the current time, location information, or other suitable information to provide relevant advertisements, in the form of notifications, to a user.

Figure 18:
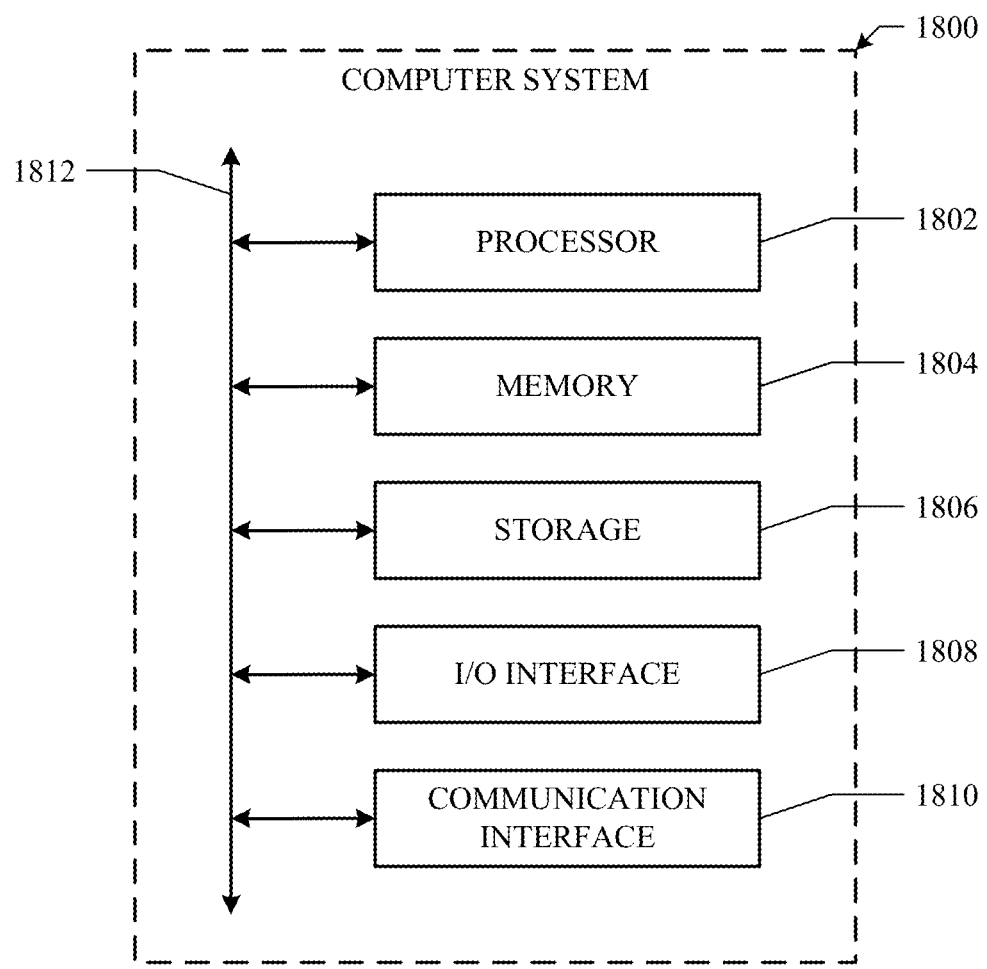
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
rendering, for one or more displays of a virtual reality (VR) display device, a first output image comprising a passthrough view of a real-world environment;
identifying, using one or more images captured by one or more cameras of the one or more displays of the VR display device, a real-world object in the real-world environment;
receiving a first user input indicating a first dimension corresponding to the real-world object;
automatically determining, based on the first dimension, a second and third dimensions corresponding to the real-world object, wherein the second and third dimensions are extrapolated based on the first dimension, and wherein the first, second, and third dimensions are orthogonal to each other; and
rendering, for the one or more displays of the VR display device, a second output image of a VR environment, wherein the VR environment comprises a mixed reality (MR) object corresponding to the real-world object, wherein the MR object is defined by the determined first, second, and third dimensions.

2. The method of claim 1, further comprising:
accessing one or more images of the real-world environment captured by the one or more cameras of the VR display device; and
rendering, for the one or more displays of the VR display device, a third output image comprising a portion of the VR environment and a portion of the passthrough view of the real-world environment based on the accessed images, wherein the portion of the passthrough view is located at a surface of the MR object in the VR environment.

3. The method of claim 2, further comprising:
receiving a second user input indicating a selection to view the portion of the passthrough view of the MR object, wherein the third output image is rendered responsive to receiving the second user input indicating the selection to view the portion of the passthrough view of the MR object.

4. The method of claim 2, further comprising:
determining the MR object is centered on a field of view of a user of the VR display device for a threshold time period, wherein the third output image is rendered responsive to determining that the MR object is centered on the field of view of the user for the threshold time period.

5. The method of claim 2, further comprising:
determining whether a user of the VR display device has approached within a threshold distance of the real-world object, wherein the third output image is rendered responsive to determining the user has approached within the threshold distance of the real-world object.

6. The method of claim 2, further comprising:
determining whether the MR object is in a field of view of a user of the VR display device, wherein the third output image is rendered responsive to determining the MR object is in the field of view of the user.

7. The method of claim 1, further comprising:
rendering, for the one or more displays of the VR display device, a virtual boundary corresponding to the real-world environment.

8. The method of claim 7, further comprising:
extending the virtual boundary to include the identified real-world object responsive to automatically determining the second and third dimensions corresponding to the real-world object.

9. The method of claim 1, further comprising:
rendering, for the one or more displays of the VR display device, a personal user interface (UI), wherein the personal UI is rendered as a virtual object proximate to a user of the VR display device, wherein the personal UI moves corresponding to the user's movement, and wherein the personal UI has one or more attributes that adapt with respect to the MR object.

10. The method of claim 9, wherein one of the attributes of the personal UI is a form factor of the personal UI, wherein a first form factor of the personal UI adapts to a second form factor of the personal UI based on a proximity of the user to the MR object.

11. The method of claim 9, wherein one of the attributes of the personal UI is a set of user functionalities of the personal UI, wherein a first set of user functionalities of the personal UI adapts to a second set of user functionalities of the personal UI based on a proximity of the user to the MR object.

12. The method of claim 1, wherein the user input indicating the first dimension of the real-world object is a virtual line created by a user of the VR display device within the VR environment defining an edge of the real-world object.

13. The method of claim 1, wherein the user input indicating the first dimension of the real-world object is two virtual points created by a user of the VR display device within the VR environment defining endpoints of a virtual line corresponding to an edge of the real-world object.

14. The method of claim 1, wherein the user input indicating the first dimension of the real-world object is a single virtual point created by a user of the VR display device within the VR environment defining a surface of the real-world object.

15. One or more computer-readable non-transitory storage media embodying software that is operable when executed to:
   render, for one or more displays of a virtual reality (VR) display device, a first output image comprising a passthrough view of a real-world environment;
   identify, using one or more images captured by one or more cameras of the one or more displays of the VR display device, a real-world object in the real-world environment;
   receive a first user input indicating a first dimension corresponding to the real-world object;
   automatically determine, based on the first dimension, a second and third dimensions corresponding to the real-world object, wherein the second and third dimensions are extrapolated based on the first dimension, and wherein the first, second, and third dimensions are orthogonal to each other; and
   render, for the one or more displays of the VR display device, a second output image of a VR environment, wherein the VR environment comprises a mixed reality (MR) object corresponding to the real-world object, wherein the MR object is defined by the determined first, second, and third dimensions.

16. The media of claim 15, wherein the software is further operable when executed to:
   access one or more images of the real-world environment captured by the one or more cameras of the VR display device; and
   render, for the one or more displays of the VR display device, a third output image comprising a portion of the VR environment and a portion of the passthrough view of the real-world environment based on the accessed images, wherein the portion of the passthrough view is located at a surface of the MR object in the VR environment.

17. The media of claim 16, wherein the software is further operable when executed to:
   receive a second user input indicating a selection to view the portion of the passthrough view of the MR object, wherein the third output image is rendered responsive to receiving the second user input indicating the selection to view the portion of the passthrough view of the MR object.

18. The media of claim 16, wherein the software is further operable when executed to:
   determine the MR object is centered on a field of view of a user of the VR display device for a threshold time period, wherein the third output image is rendered responsive to determining that the MR object is centered on the field of view of the user for the threshold time period.

19. The media of claim 16, wherein the software is further operable when executed to:
   determine whether a user of the VR display device has approached within a threshold distance of the real-world object, wherein the third output image is rendered responsive to determining the user has approached within the threshold distance of the real-world object.

20. A system comprising: one or more processors; and a non-transitory memory coupled to the processors comprising instructions executable by the processors, the processors operable when executing the instructions to:
   render, for one or more displays of a virtual reality (VR) display device, a first output image comprising a passthrough view of a real-world environment;
   identify, using one or more images captured by one or more cameras of the one or more displays of the VR display device, a real-world object in the real-world environment;
   receive a first user input indicating a first dimension corresponding to the real-world object;
   automatically determine, based on the first dimension, a second and third dimensions corresponding to the real-world object, wherein the second and third dimensions are extrapolated based on the first dimension, and wherein the first, second, and third dimensions are orthogonal to each other; and
   render, for the one or more displays of the VR display device, a second output image of a VR environment, wherein the VR environment comprises a mixed reality (MR) object corresponding to the real-world object, wherein the MR object is defined by the determined first, second, and third dimensions.

* * * * *